(12) United States Patent
Kim et al.

(10) Patent No.: US 7,885,531 B2
(45) Date of Patent: Feb. 8, 2011

(54) APPARATUS, MEDIUM, AND METHOD FOR PHOTOGRAPHING BASED ON FACE DETECTION

(75) Inventors: Jung-bae Kim, Suwon-si (KR); Chan-min Park, Seongnam-si (KR); Eui-hyeon Hwang, Goyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1187 days.

(21) Appl. No.: 11/317,026

(22) Filed: Dec. 27, 2005

(65) Prior Publication Data

US 2006/0140614 A1 Jun. 29, 2006

(30) Foreign Application Priority Data

Dec. 28, 2004 (KR) ...................... 10-2004-0113805

(51) Int. Cl.
 *G03B 15/03* (2006.01)
 *G03B 17/18* (2006.01)
 *G03B 17/20* (2006.01)
 *G06K 9/46* (2006.01)
(52) U.S. Cl. .................. 396/153; 396/283; 396/287; 396/296; 382/118; 382/190; 348/169
(58) Field of Classification Search .................. 396/153, 396/281, 293, 287; 382/118, 123, 190, 192–203; 348/169
See application file for complete search history.

(56) References Cited

U.S. PATENT DOCUMENTS

| 6,636,694 | B1 | 10/2003 | Misumi et al. |
| 2002/0191818 | A1* | 12/2002 | Matsuo et al. ............... 382/118 |
| 2003/0108244 | A1* | 6/2003 | Li et al. ....................... 382/227 |
| 2003/0151674 | A1* | 8/2003 | Lin ........................... 348/222.1 |

FOREIGN PATENT DOCUMENTS

| JP | 2002-176619 | 6/2002 |
| KR | 10-2004-0017998 | 3/2004 |

* cited by examiner

*Primary Examiner*—Rochelle-Ann J Blackman
(74) *Attorney, Agent, or Firm*—Staas & Halsey LLP

(57) ABSTRACT

A photographing method, medium, and apparatus based on face detection in a portable camera. The portable photographing apparatus may include an image input unit that receives an image, a face detection unit that detects a face from the received image, a storage unit that stores the image detected by the face detection unit as a moving image in a first mode, and a quality evaluation unit that evaluates the quality of the image detected by the face detection unit and stores the same as a still image in a second mode upon satisfaction of predetermined conditions evaluated based on the quality evaluation of the still image.

52 Claims, 22 Drawing Sheets

SUCCEED

SUCCEED

APPARATUS, MEDIUM, AND METHOD FOR PHOTOGRAPHING BASED ON FACE DETECTION

CROSS-REFERENCE TO RELATED APPLICATIONS

This application claims priority benefit from Korean Patent Application No. 10-2004-0113805 filed on Dec. 28, 2004 in the Korean Intellectual Property Office, the disclosure of which is incorporated herein by reference in its entirety.

BACKGROUND OF THE INVENTION

1. Field of the Invention

Embodiments of the present invention relate to a photographing apparatus, medium, and method, and more particularly, to a photographing apparatus, medium, and method detecting a still image and/or moving image of a to-be-photographed person based on face detection and examining the quality of the detected image, thereby providing a high-quality still and/or moving image of the to-be-photographed person.

2. Description of the Related Art

Recently, along with the advancement of semiconductor and image processing technologies, portable digital cameras, camcorders, cellular phone cameras, and the like, that include built-in mobile communication devices with digital camera capabilities, which will be called 'portable photographing apparatuses' hereinafter, have emerged and gained popularity. The portable photographing apparatuses are capable of photographing not only still images but also moving images of a to-be-photographed person. In particular, the portable photographing apparatus has widely been used in photographing the to-be-photographed person.

Despite widespread use, it has been found that the portable photographing apparatuses have several problems. When a still image of a person is to be generated, it is quite difficult to determine the proper location of the to-be-photographed person. For instance, a photographer may want to photograph the face of a person who is continuously moving. In such a condition, it is not easy to spontaneously take a picture by accurately pressing the shutter at the moment when the face of the person is accurately positioned at a proper location.

In this connection, Korean Patent Published Application No. 2004-0017998 has discussed the increasing of accuracy of a captured image by outputting a guide message for directing an orientation of the person to be photographed to be positioned at the center of an image sensor for an accurate face image, i.e., by providing the to-be-photographed person with time for correcting the position of his/her face. In addition, U.S. Pat. No. 6,636,694 has discussed the providing of a guide as to proper orientation of a to-be-photographed person for positioning of the pupils of a to-be-photographed person when photographing a photo for an identification card or a passport.

However, here, these discussions relate to of the directed orientation of the face of a to-be-photographed person at a predetermined position using a fixed camera, and is not suitable for applications of portable photographing apparatuses, e.g., for attaining a high quality face image.

In addition, even when a portable photographing apparatus is used in photographing a moving image, the available photographing time may usually be shortened due to the limited memory capacity of the portable photographing apparatus. For instance, unnecessary background images may be stored even though only a moving image of a to-be-photographed person is desired, resulting in the wasting of memory space.

Here, Japanese Patent Published Application No. 2002-176619 discusses the clipping and transmitting of only frames, among pre-recorded moving image frames, where a to-be-photographed person faces the front of a portable communication terminal, with frames having sound exceeding a predetermined level being determined as corresponding to the face oriented frames. According to this discussion, however, since image sequences of a face are clipped from previously photographed moving images, using the portable communication terminal, it is quite difficult to store moving images of the user using a portable photographing apparatus on a real-time basis.

Meanwhile, to photograph a to-be-photographed person, using the portable photographing apparatus, the to-be-photographed person should be positioned at the center of a focusing area. In conventional photographing apparatuses having distance-based auto-focusing capabilities, focus is adjusted in the center of the image without regard to the position of the to-be-photographed person. That is to say, no direct solution for auto-focusing has yet been proposed.

Thus, it has been found that in order to take a still image of a person to be photographed, using a portable photographing apparatus, it is desirable to automatically identify the position of the face of the to-be-photographed person to notify a user of the portable photographing apparatus of an appropriate photographing state. In addition, in the case where the user intends to take a moving image of the to-be-photographed person, moving images of the to-be-photographed person should be stored only when a face of the of the to-be-photographed person is detected, thereby extending the available time for which all moving images can be stored, i.e., additional moving image data can be stored.

SUMMARY OF THE INVENTION

Embodiments of the present invention provide a portable photographing apparatus, medium, and method photographing a high quality still image and/or moving image of a to-be-photographed person, e.g., using a portable photographing apparatus having a face detection capability.

To achieve the above and/or other aspects and advantages, embodiments of the present invention set forth a portable photographing apparatus, including a face detection unit to detect a face from a received image, a storage unit to store the received image upon detection of the face as a moving image in a first mode, and a quality evaluation unit to evaluate a quality of the received image and to store the received image as a still image in a second mode upon a satisfaction of a selective predetermined condition evaluated based on a quality evaluation of the received image.

The portable apparatus may further include an image input unit to receive the image as the received still image. In addition, the face detection unit may include a subwindow generation module to receive an image from the image input unit and generate a subwindow corresponding to the received image, a first face search module to receive the subwindow from the subwindow generation module and to detect a face from the subwindow to determine whether a frontal-view face exists, a second face search module to, if the frontal-view face is detected by the first face search module, sequentially detect two mode faces among a first mode face generated by up and down facial rotation, a second mode face made by a leaning of a head to either side of left and right sides, and a third mode face made by left and right facial rotation, and a third face search module to detect a remaining mode face not detected by the second face search module.

The face detection unit may further include a face detection control module to generate a new subwindow to be supplied to the first face search module if no face is detected by any of the first face search module, the second face search module, or the third face search module.

Further, the third face search module may sequentially perform an operation of arranging face detectors for all directions in parallel, and when succeeding in face detection in one direction perform face detection in a same direction using a more complex face detector, and when failing in face detection in one direction perform face detection in a different direction, and an operation of independently and separately arranging the face detectors for all directions, such that when succeeding in face detection in one direction performing face detection in a same direction using a more complex face detector, and when failing in face detection determining that a face is not detected from the input image.

The second face search module may perform sequential detection of the two mode faces using a coarse-to-fine search algorithm. In addition, the second face search module may attempt detection of one of the two mode faces using a simple-to-complex search algorithm.

The quality evaluation unit may evaluate an illumination condition of the received image, evaluates a face size of the received image, evaluate an image blur state of the received image, and/or cause a focusing to be adjusted on the face in the received image as detected by the face detection unit.

The apparatus may further include a user interface unit to provide for a user interface to allow a user to select a moving image mode or a still image mode, to provide for a user interface to allow a user to select an automatic photographing mode or a manual photographing mode for when the face is detected, and/or to provide for a user interface to allow a user to select an image quality characteristic to be implemented for the quality evaluation.

To achieve the above and/or other aspects and advantages, embodiments of the present invention set forth a method of photographing a picture in a portable photographing apparatus based on face detection, the method including receiving an image, detecting a face from the received image, and storing the received image detected by the face detection unit as a moving image in a first mode, and evaluating the quality of the received image detected by the face detection unit and storing the received image as a still image in a second mode upon satisfaction of a selective predetermined condition evaluated based on a quality evaluation of the received image.

The detecting of the face may include sequentially detecting two mode faces among a first mode face generated by up and down facial rotation, a second mode face generated by a leaning of a head to either side of left and right sides, and a third mode face made by left and right facial rotation, detecting a remaining mode face that is not detected in the sequentially detecting of the two faces, and if the remaining mode face is detected in the detecting of the remaining mode face, determine whether the face is detected from the image, wherein the detecting of the remaining mode face includes arranging face detectors for all directions in parallel to perform face detection, and independently and separately arranging the face detectors for all directions to perform face detection.

In the parallel arranging of the face detectors, when succeeding in face detection in one direction face detection may be performed in a same direction using a more complex face detector, and when failing in face detection in one direction face detection may be performed in a different direction.

In the independently and separately arranging of the face detectors, when succeeding in face detection in one direction face detection may be performed in a same direction using a more complex face detector, and when failing in face detection non-detection of a face may be determined for the received image.

The sequentially detecting of the two mode faces may include sequentially detecting the two mode faces using a coarse-to-fine search algorithm. The sequentially detecting of the two mode faces may include sequentially detecting one of the two mode faces using a simple-to-complex search algorithm.

In addition, the selective predetermined condition may be an illumination condition of the received image, a face size of the received image, an image blur state of the received image, and/or a focusing adjustment performed on the face in the received image.

The method may further include providing a user interface to allow a user to select a moving image mode or a still image mode, providing a user interface to allow a user to select an automatic photographing mode or a manual photographing mode for the face detection, and/or providing a user interface to allow a user to select an image quality condition for the predetermined condition.

To achieve the above and/or other aspects and advantages, embodiments of the present invention set forth an imaging apparatus, including a face detection unit to detect a face from a received image through a multilayer face detection scheme, with a broader face detection being first applied and a narrower face detection secondly being applied, wherein the narrower face detection is only implemented after detection of a face through the broader face detection, and a storage unit to store the received image, upon a detection of the face, as a moving image or a still image.

To achieve the above and/or other aspects and advantages, embodiments of the present invention set forth an imaging apparatus, including a face detection unit to detect a face from a received image through a multilayer face detection scheme, with the different layers of face detection separately detecting for a face through respective particular axis of movement of a face, and a storage unit to store the received image, upon a detection of the face, as a moving image or a still image.

To achieve the above and/or other aspects and advantages, embodiments of the present invention set forth an imaging apparatus, including a face detection unit to detect a face from a received image through a multilayer face detection scheme, with the different layers of face detection separately detecting for a particular potential orientation of a face in the received image and with the different layers of face detection being implemented with a number of face orientation detectors less than a number of particular potential face orientations in the received image, and a storage unit to store the received image, upon a detection of the face, as a moving image or a still image.

To achieve the above and/or other aspects and advantages, embodiments of the present invention set forth a portable photographing apparatus, including a means for face detection of a face from a received image, and a storage unit to store the received image based upon detection of the face as a moving image or a still image.

To achieve the above and/or other aspects and advantages, embodiments of the present invention set forth a portable photographing apparatus, including a face detection unit to detect a face from a received image, a storage unit to store the received image based upon detection of the face as a moving image or a still image, and a means for quality evaluation of the received image and to store the received image as a still image upon a satisfaction of a selective predetermined condition evaluated based on a quality evaluation of the received image.

To achieve the above and/or other aspects and advantages, embodiments of the present invention set forth at least one medium including computer readable code to implement method embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
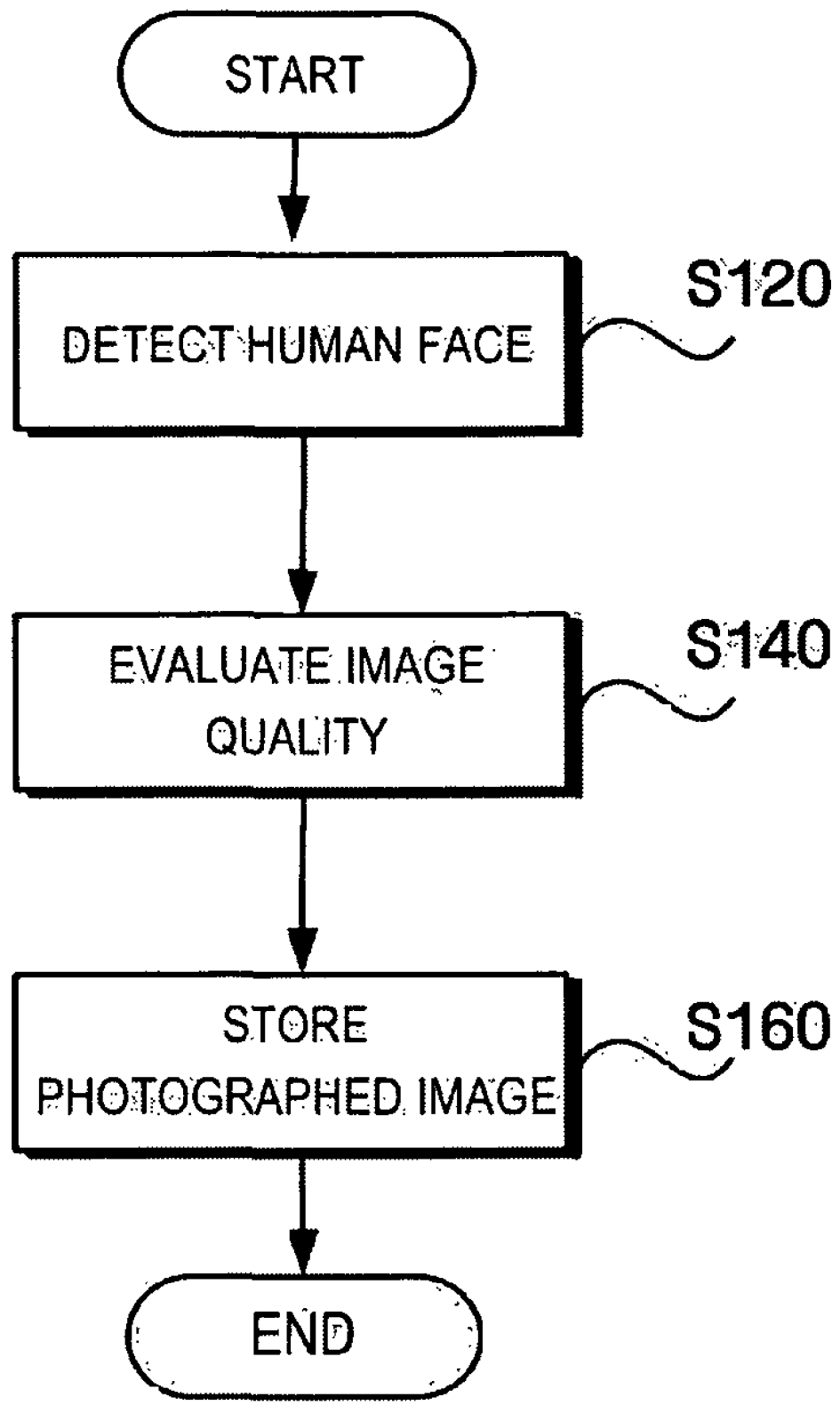
FIG. 1 illustrates a method of photographing a picture, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a photographing process, according to an embodiment of the present invention.

In order for a user to photograph a still and/or moving image of a to-be-photographed person using a portable photographing apparatus, according to an embodiment of the present invention, a face may be detected from an input image, in operation S120. The detecting of the face will be described in more detail below with reference to FIGS. 3 through 17.

When a face is detected, in operation S120, an image quality of the detected face may be evaluated, in operation S140. Here, determination of the image quality may preferably be based on a still image of the to-be-photographed person, for example. In addition, determination may be made as to an illumination intensity, face size, blur presence or absence, or focusing. Details of the image quality will be described in greater detail below with reference to FIGS. 18 through 22. Images satisfying the above-described quality conditions may be stored in the portable photographing apparatus, for example, in operation S160.

Figure 2:
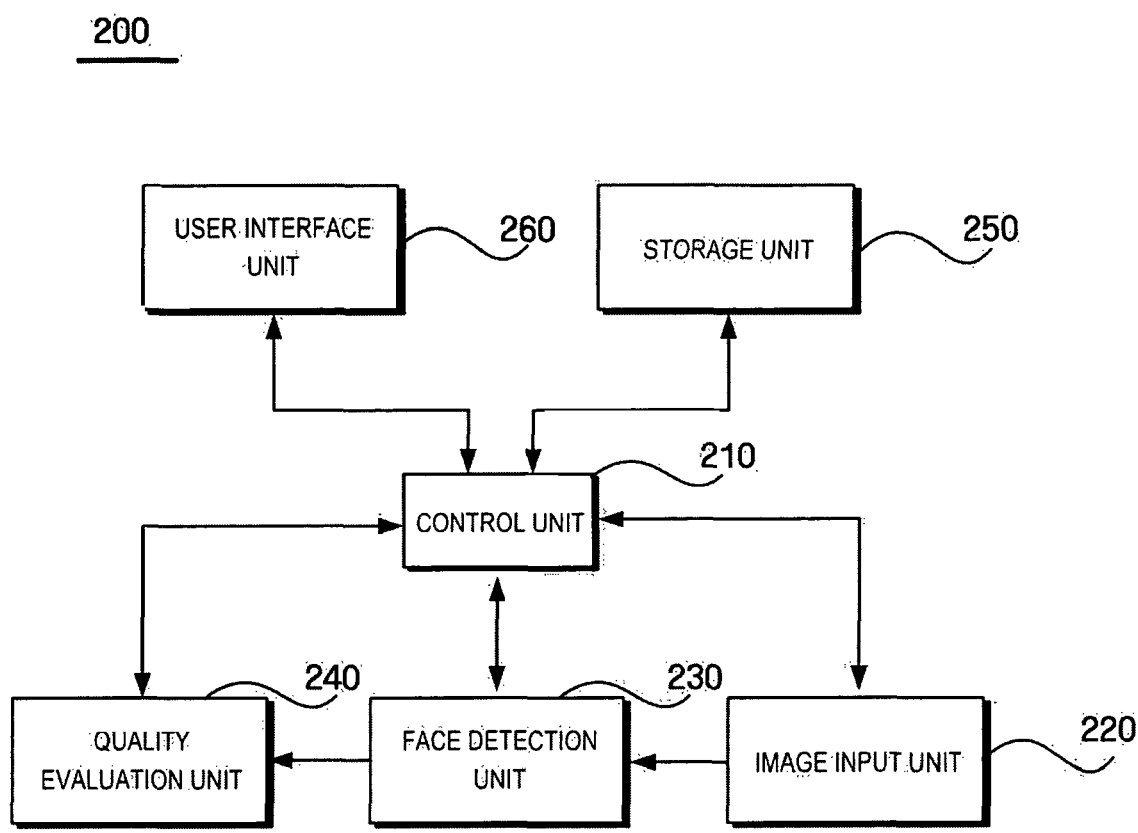
FIG. 2 illustrates a portable photographing apparatus, according to an embodiment of the present invention.

FIG. 2 illustrates a portable photographing apparatus, according to an embodiment of the present invention.

The portable photographing apparatus 200 may include an image input unit 220, a face detection unit 230, a quality evaluation unit 240, a control unit 210, a user interface unit 260, and a storage unit 250, for example.

The image input unit 220 may receive an image from an external image input device, for example, such as a camera, and the face detection unit 230 may detect a face from the image received from the image input unit 220.

The quality evaluation unit 240 may evaluate an image, detected by the face detection unit 230, for example, which may preferably be a still image, though embodiments of the present invention are not limited thereto. The storage unit 250 may store the picture determined as being an image satisfying predetermined conditions according to the quality evaluation unit 240.

The user interface unit 260 may allow a user to set a picture mode, for example, to a moving image mode or a still image mode, to set a photographing mode to an automatic photographing mode or a manual photographing mode, or to set an image quality mode, noting that additional embodiments are equally available.

The control unit 210 may control operations performed among the image input unit 220, the face detection unit 230, the image quality evaluation unit 240, the user interface unit 260, and/or the storage unit 250 for example.

Herein, the term "unit" is intended to be open to, but is not limited to, a software and/or hardware component, such as a Field Programmable Gate Array (FPGA) or Application Specific Integrated Circuit (ASIC), which can perform certain tasks, for example. A module may advantageously be configured to reside on an addressable storage medium and configured to execute on one or more processors. Such a module may include, by way of only an example, components, such as software components, object-oriented software components, class components and/or task components, processes, functions, attributes, procedures, subroutines, segments of program code, drivers, firmware, microcode, circuitry, data, databases, data structures, tables, arrays, and variables, for example. The functionality provided for in the components and modules may be combined into fewer components and modules or further separated into additional components and modules. In addition, the components and modules may be implemented such that they execute one or more computers in a communication system, again noting that additional embodiments are available.

In order for a user to photograph a still or moving image, a picture selection mode, a photographing mode, a quality mode and the like may be set by the user interface unit 260 of the portable photographing apparatus 200.

Here, the picture mode may be a selection mode determining whether a moving image or a still image is to be photographed. For example, the photographing mode may be a selection mode determining whether a face is to be photographed automatically (automatic photographing mode) or manually (manual photographing mode). The image quality mode may be a selection mode controlling an evaluation of an illumination condition, a face size, and/or image blurs, adjustment of auto-focusing, and execution of any or all of these functions.

The respective modes may be offered to a user on a display screen (not shown), for example, embedded in the portable photographing apparatus, and may preferably be provided to a user in a tree structure, noting that additional embodiments are available. The portable photographing apparatus 200 may similarly include mechanisms for setting any of the respective modes as desired by the user. As only an example, the setting mechanisms may include four-way key buttons, selection buttons, and the like. In another embodiment of the present invention, all or some of the respective modes may be preprogrammed in the control unit 210 prior to being operated, e.g., during a manufacturing stage.

Information corresponding to each of the respective modes input from the user interface unit 260 may be transferred to the control unit 210, and the control unit 210 may control the image input unit 220, the face detection unit 230, the quality evaluation unit 240 and the storage unit 250 based on the transferred information.

In a case where the user intends to photograph a still image of a person, for example, the face detection unit 230 may detect a face from the input image received from the image input unit 220 and transfer the input image to the quality evaluation unit 240. Here, the quality evaluation unit 240 may determine whether an item selected for quality evaluation satisfies predetermined criteria, and, if yes, may notify the control unit 210.

In an automatic photographing mode, the control unit 210 may control the photographing of the corresponding image to be photographed automatically and store the photographed image in the storage unit 250. In a manual photographing mode, the control unit 210 may notify the user of the set mode, in a predetermined manner, and when the user manually photographs the corresponding image by a predetermined method, the control unit 210 may then control the corresponding image to be stored in the storage unit 250. Here, the predetermined method may include, for example, a visual display mechanism such as an LED, an alarm, and so on, noting that additional embodiments are equally available.

When the user intends to photograph a moving image of person, for example, the face detection unit 230 may detect a face from the input image received from the image input unit 220, transfer the detected face image to the quality evaluation unit 240, or directly store the same in the storage unit 250. Here, since evaluation of all of the above-stated evaluation items may cause a disconnection of the face image, only auto-focusing adjustment may preferably be evaluated in this stage.

Alternatively, the control unit 210 may perform the auto-focusing operation on the still or moving image.

A face detection method, performed by the face detection unit 230, will now be described with greater detail with reference to FIGS. 3 through 17.

To detect a face, it is beneficial to determine and define face rotation angles available to people.

Figure 3:
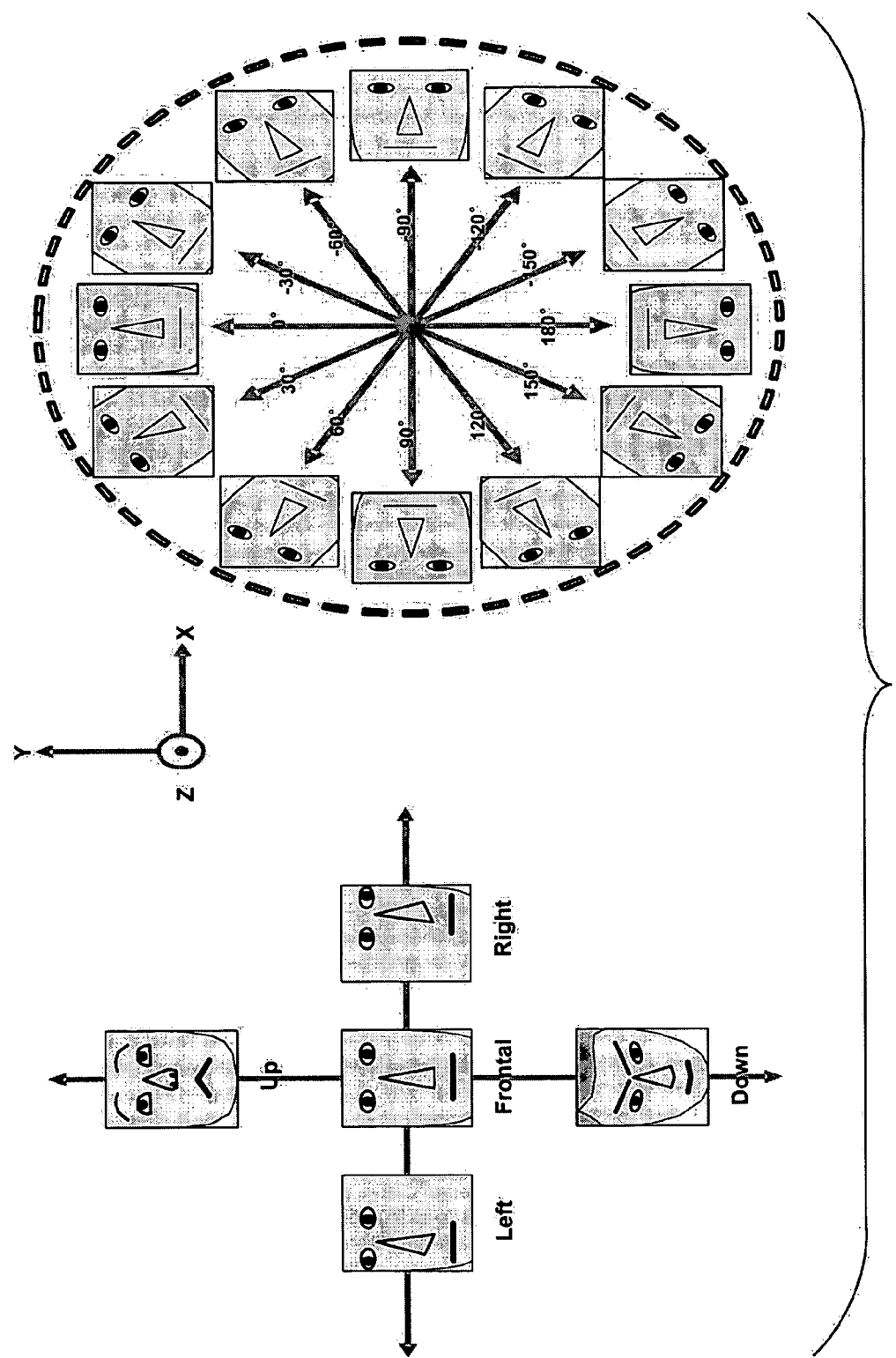
FIG. 3 illustrates directions in which a face may be rotated using a three-dimensional coordinate axis.

As shown in FIG. 3, a face may be rotated around, for example, three-dimensional coordinate axes, e.g., an X-axis, a Y-axis, and a Z-axis.

When the face is rotated around the X-axis, an up-view, a frontal-view, and a down-view may be defined.

When the face is rotated around the Y-axis, a left-view, a frontal-view, and a right-view may be defined.

When the face is rotated around the Z-axis, views may be discriminated according to a leaning angle. As illustrated in FIG. 3, the face may lean at intervals of 30 degrees, noting that this selection has been chosen for simplicity in explanation and additional embodiments are available.

Thus, for explanation of embodiments of the invention, rotation angles available to people will be described with respect to each of the X-, Y-, and Z-axes, again noting that an alternative coordinate system may also be available.

Figure 4:
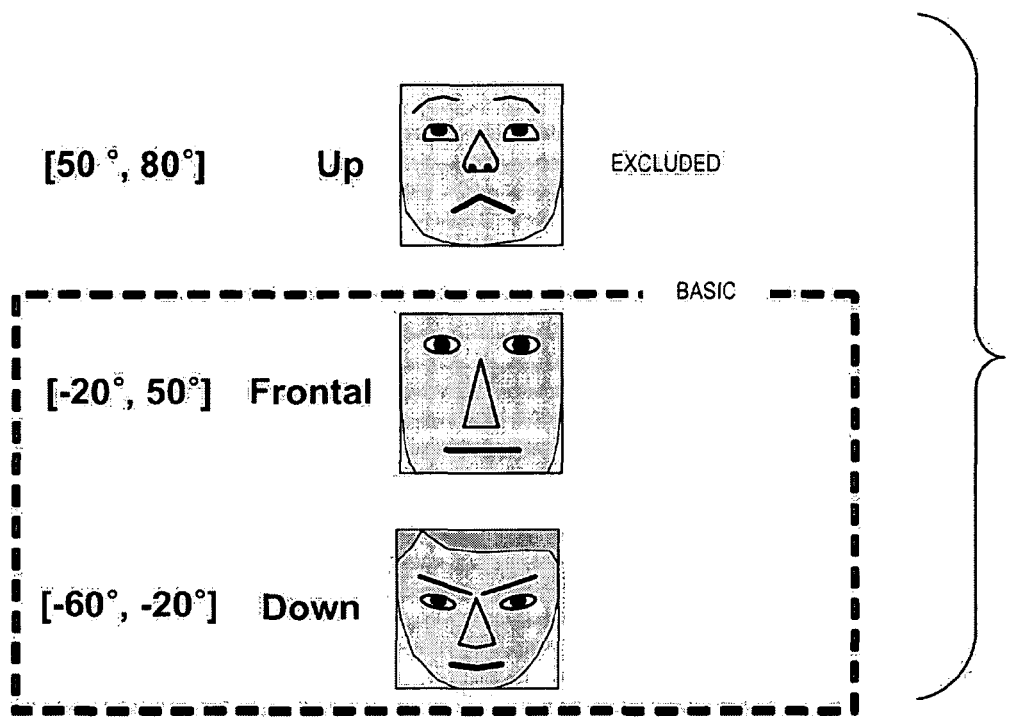
FIG. 4 illustrates angles at which a face may be rotated around an X-axis.

FIG. 4 illustrates rotation angles of a face around the X-axis. Here, rotation around the X-axis, i.e., X-rotation, may be referred to as "nodding rotation" or "out-of-plane rotation." The X-rotation (i.e., up-and-down nodding) may have a range of about [−60°, 80°], for example. However, an up-view face in a range of [20°, 50°] also has a high occurrence frequency and may be detected by a method of detecting a frontal-view face, for example. It has been found that an up-view face in a range of [50°, 80°] may rarely occur and may not show face elements well, and thus, may be thus excluded from detection. With respect to the X-rotation, thus, only a down-view face in a range of [−60°, −20°] and a frontal-view face in a range of [−20°, 50°] may detected, in an embodiment of the present invention. In the case of photographing a still image, only a frontal-view face in a range of [−20°, 20°] may be detected, according to another embodiment of the present invention.

Figure 5:
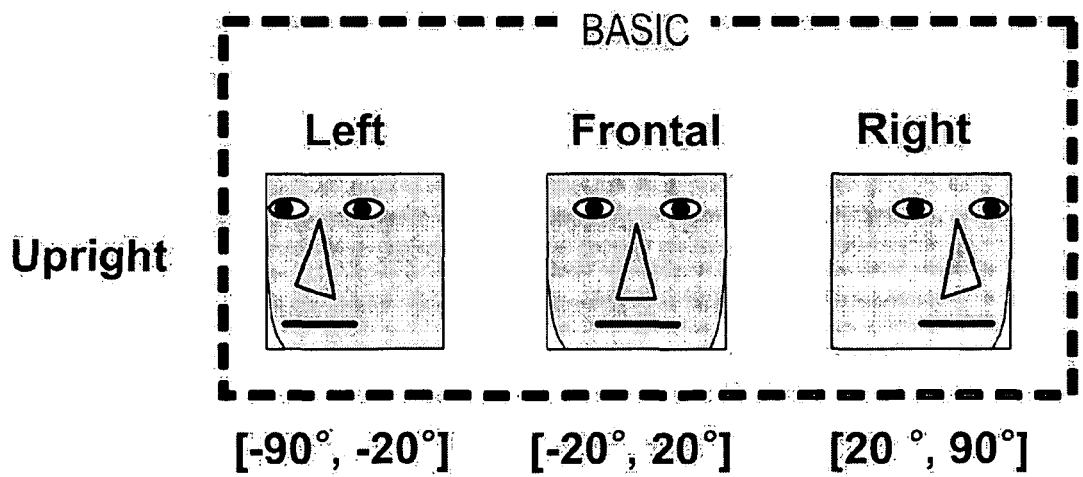
FIG. 5 illustrates angles at which a face may be rotated around a Y-axis.

FIG. 5 illustrates rotation angles of a face around the Y-axis. Rotation around the Y-axis, i.e., Y-rotation, will be referred to as "out-of-plane rotation."

The Y-rotation (left and right rotation) may have a range of [−180°, 180°]. However, in a range of [180°, −90°] and a range of [90°, 180°], the back of a head would occupy more of the image than a face. Accordingly, in an embodiment of the present invention, only a left-view face in a range of [−90°, −20°], a frontal-view face in a range of [−20°, 20°], and a right-view face in a range of [20°, 90°] are detected with respect to the Y-rotation. In a case of photographing a still image, only a frontal-view face in a range of [−20°, 20°] may be detected, according to another embodiment of the present invention.

When a face is rotated around the Z-axis, Z-rotation (left and right leaning) has a range of [−180°, 180°]. Here, the Z-rotation will be referred to as "in-plane rotation."

With respect to Z-rotation, all rotation in the range of [−180°, 180°] may be dealt with. However, people usually only lean their faces in a range of [−45°, 45°] when standing. Accordingly, detection may be performed with respect to rotation in the range of [−45°, 45°] in a basic mode, and performed with respect to rotation in the range of [−180°, 180°] in an extension mode, according to an embodiment of the present invention.

Figure 6A:
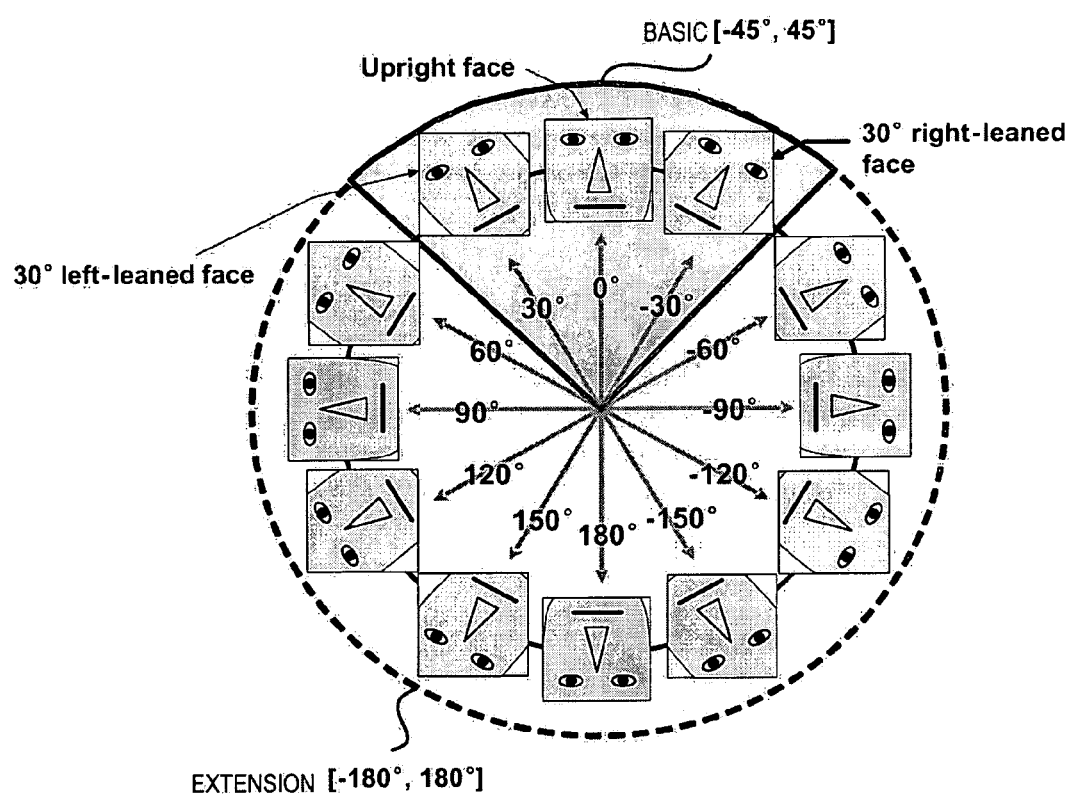
FIGS. 6A and 6B illustrate angles at which a face may be rotated around a Z-axis, and alternate angles at which a face may be rotated around the Z-axis, respectively.
Figure 6B:
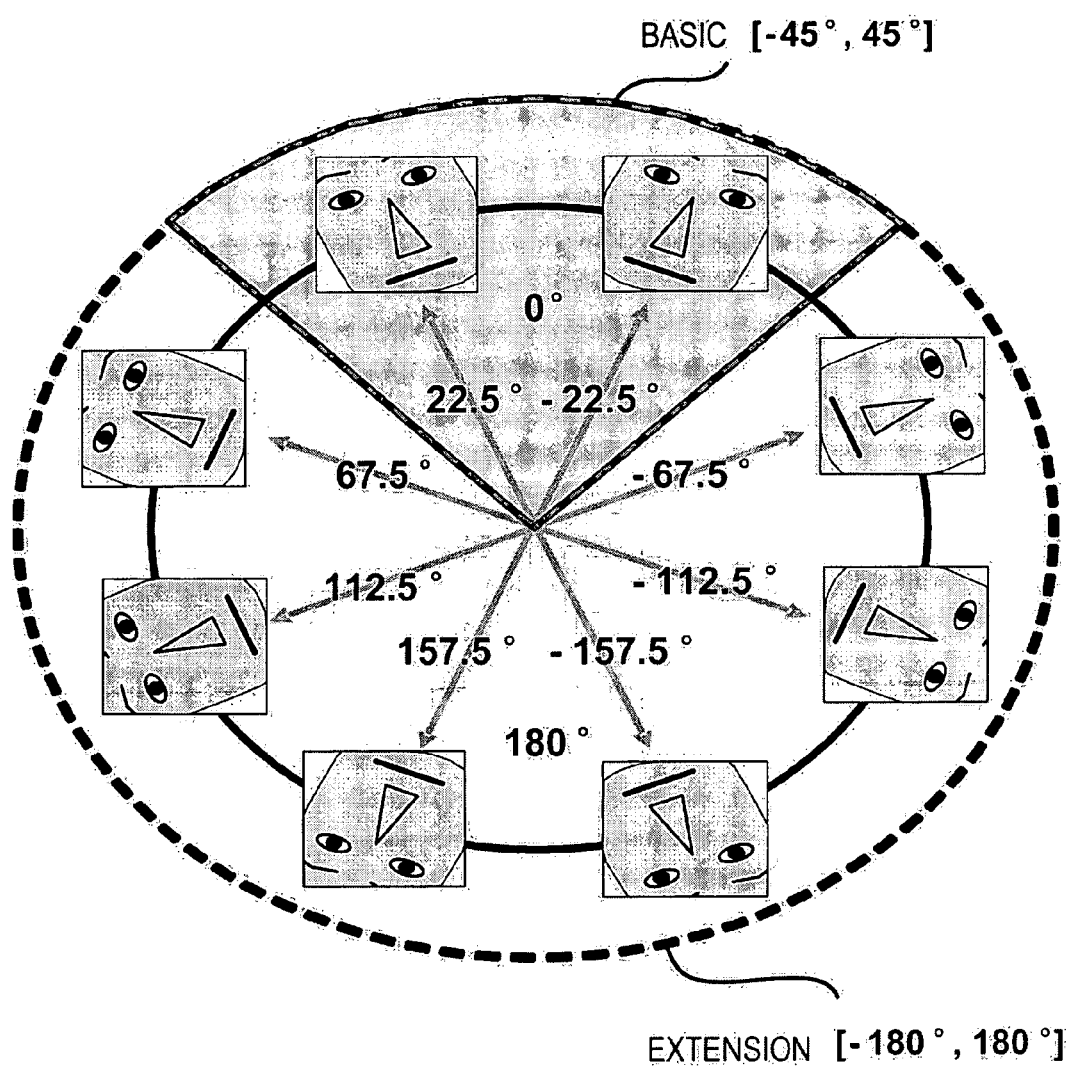

In addition, with respect to the Z-rotation, a face may be defined as leaning according to intervals of 30° and 45°, which are respectively illustrated in FIGS. 6A and 6B.

Hereinafter, a mode illustrated in FIG. 6A may be referred to as a first Z-rotation mode and a mode illustrated in FIG. 6B may be referred to as a second Z-rotation mode, noting that additional embodiments are equally available.

In the Z-rotation, a left-leaning face, an upright face, and a right-leaning face may be defined.

Accordingly, Table 1 below shows ranges of rotation angles of a face to be detected, according to an embodiment of the present invention.

TABLE 1

| Division | | X-rotation | Y-rotation | Z-rotation |
|---|---|---|---|---|
| Description | | Up-and-down nodding | Left and right rotation | Left and right leaning |
| Rotatable angte | | [−60°, 80°] | [−180°, 180°] | [−180°, 180°] |
| Detection target | Basic mode | [−60°, 50°] | [−90°, 90°] | [−45°, 45°] |
| | Extension mode | [−60°, 50°] | [−90°, 90°] | [−180°, 180°] |

Meanwhile, the face detection unit 230, according to an embodiment of the present invention, may detect a face using cascaded classifiers, each of which is trained with conventional appearance-based pattern recognition, i.e., an Ada-Boost algorithm. The AdaBoost algorithm is a very efficient learning algorithm that configures a plurality of simple and fast weak classifiers in a form of a weighted sum, thereby producing a single strong classifier which is fast and has a high success rate. Hereinafter, a strong classifier for detecting a particular face pose will be referred to as a "face detector."

The face detector, thus, may discriminate a face from a non-face in an input image using a plurality of learned face patterns. It may also be necessary to determine face patterns to be learned.

As described above, to detect a down-view face in the range of [−60°, −20°] and a frontal-view face in the range of [−20°, 50°], with respect to the X-rotation, two face detectors may be needed.

In addition, to detect a left-view face in the range of [−90°, −20°], a frontal-view face in the range of [−20°, 20°], and a right-view face in the range of [20°, 90°] with respect to the Y-rotation, three face detectors may be needed.

In the aforementioned first Z-rotation mode, 12 face detectors may be needed in the extension mode and three face detectors may be needed in the basic mode. In the aforementioned second Z-rotation mode, 8 face detectors may be needed in the extension mode and two face detectors may be needed in the basic mode.

Consequently, when all of the X-, Y-, and Z-rotations are considered in the first Z-rotation mode, 2×3×3=18 face detectors may be needed in the basic mode and 2×3×12=72 face detectors may be needed in the extension mode.

When all of the X-, Y-, and Z-rotations are considered in the second Z-rotation mode, 2×3×2=12 face detectors may be needed in the basic mode and 2×3×8=48 face detectors may be are needed in the extension mode.

Figure 7:
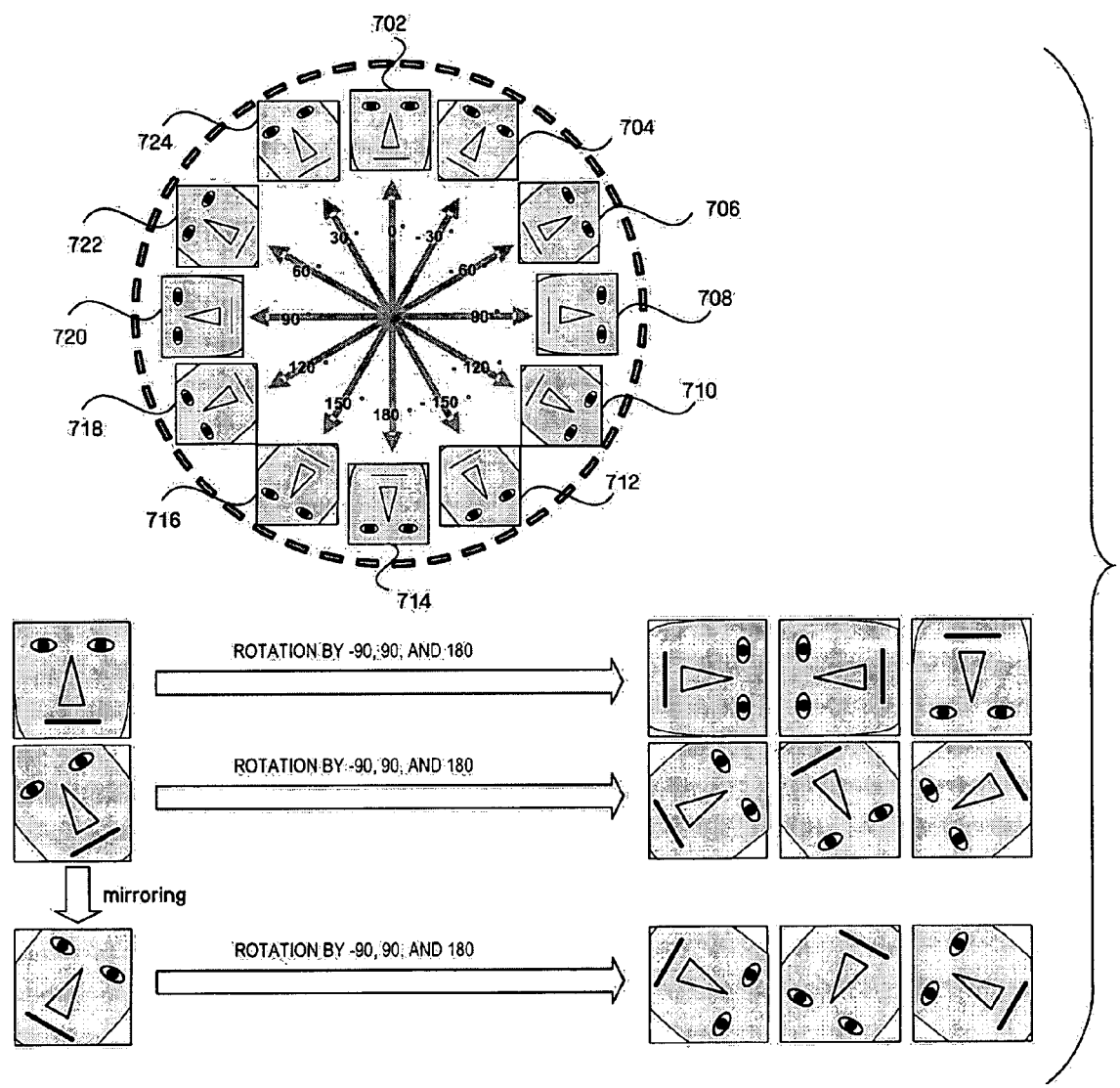
FIG. 7 illustrates a reducing of the number of face detectors desired for learning in a first Z-rotation mode for a frontal-view face, according to an embodiment of the present invention.

However, in the first and second Z-rotation modes, the number of face detectors for learning can be reduced, according to an embodiment of the present invention, by using rotation or mirroring (changing left and right coordinates), as illustrated in FIG. 7.

For example, with respect to a frontal-view face in the first Z-rotation mode, when an upright face 702 is rotated by −90°, 90°, and 180°, face images 708, 720, and 714 can be obtained. When a 300 left-leaning face 724 is rotated by −90°, 90°, and 180°, face images 706, 718, and 712 can be obtained. In addition, when the 30° left-leaning face 724 is mirrored, a 30° right-leaning face 704 can be obtained. When the 30° right-leaning face 704 is rotated by −90°, 90°, and 180°, face images 710, 722, and 716 can be obtained. As a result, since faces, other than the upright face 702 and the 30° left-leaning face 724, can be obtained through rotation or mirroring, 12 face detectors for a frontal-view face may be obtained by learning merely two face detectors, according to an embodiment of the present invention.

Figure 8:
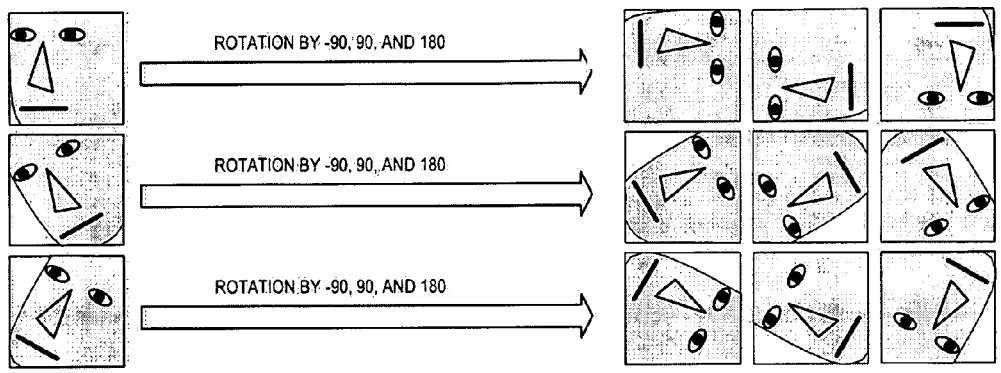
FIG. 8 illustrates a reducing of the number of face detectors desired for learning in the first Z-rotation mode for a left-view face, according to an embodiment of the present invention.

In a similar manner, as shown in FIG. 8, 12 face detectors may be obtained using three face detectors with respect to a left-view face. In addition, a right-view may be obtained by mirroring the left-view face.

Figure 9:
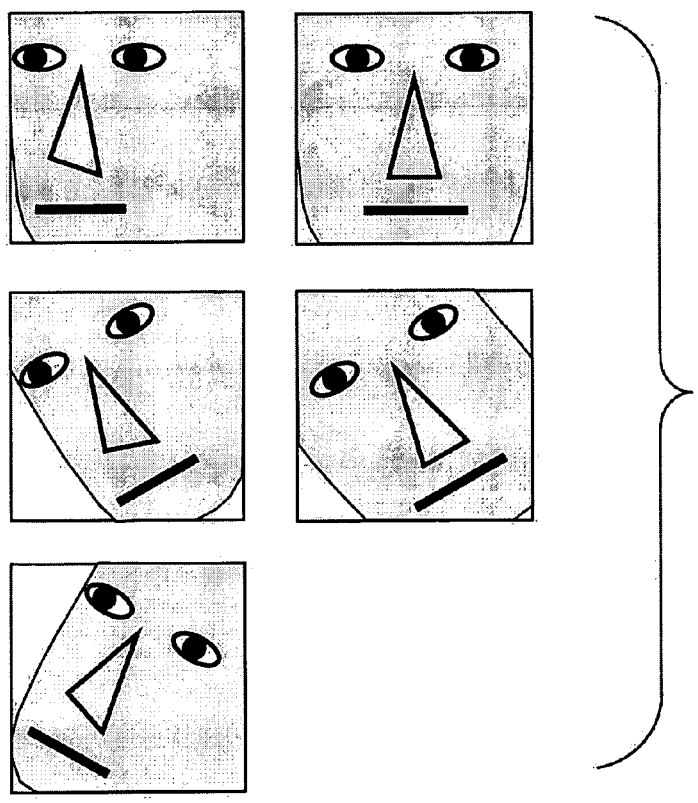
FIG. 9 illustrates faces to be learned, with respect to a frontal-view face, in the first Z-rotation mode, according to an embodiment of the present invention.

Consequently, when all of the X-, Y-, and Z-rotations are considered in the first Z-rotation mode, 2 (a frontal-view and a down-view)×5=10 face detectors may be needed to be learned in the basic and extension modes. Here, faces to be learned, with respect to the frontal-view face, are shown in FIG. 9.

Figure 10:
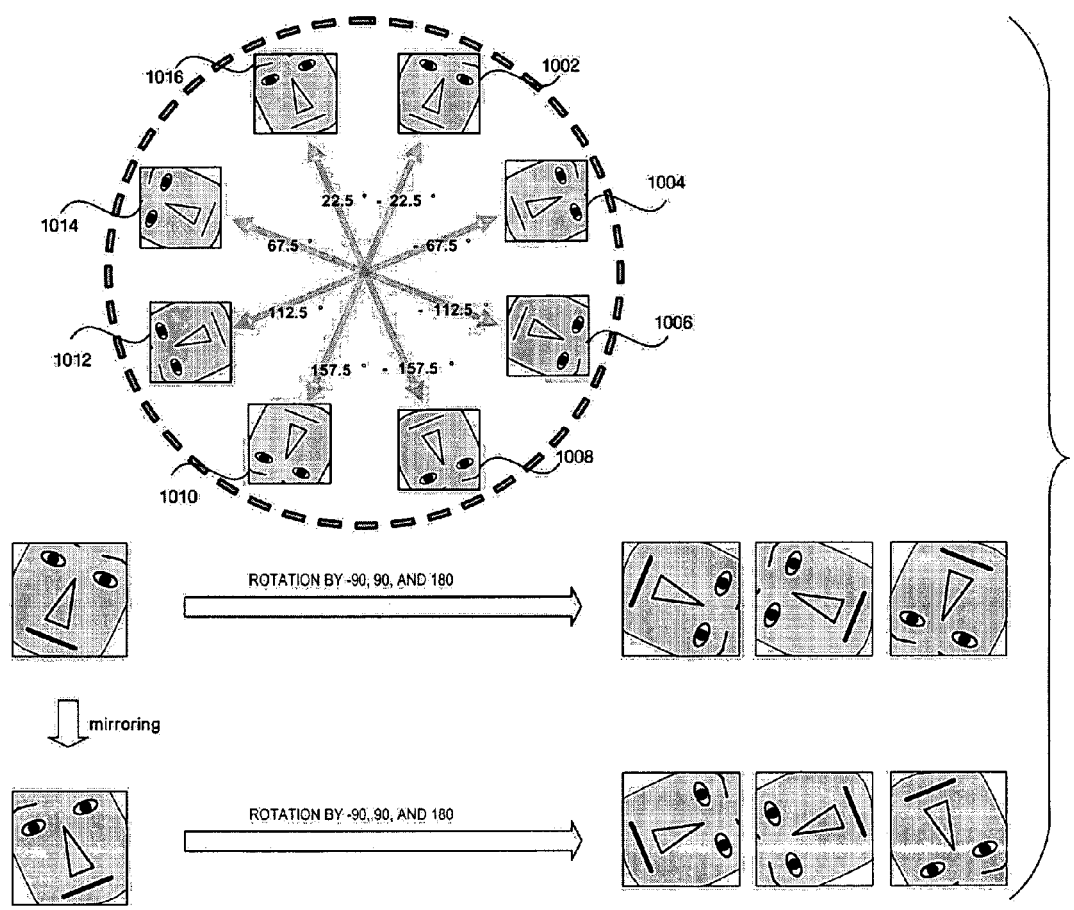
FIG. 10 illustrates a reducing of the number of face detectors desired for learning in a second Z-rotation mode for a frontal-view face, according to an embodiment of the present invention.

FIG. 10 illustrates a procedure for reducing the number of face detectors necessary for learning in the second Z-rotation mode for a frontal-view face, according to an embodiment of the present invention.

Referring to FIG. 10, with respect to a frontal-view face in the second Z-rotation mode, when a right-leaning face 1002 in the basic mode is rotated by −90°, 90°, and 180°, face images 1006, 1014, and 1010 can be obtained. When the right-leaning face 1002 is mirrored, a left-leaning face 1016 can be obtained. When the left-leaning face 1016 is rotated by −90°, 90°, and 180°, face images 1004, 1012, and 1008 can be obtained. Consequently, when only the right-leaning face 1002 is learned, other faces may be obtained through rotation or mirroring. Accordingly, 8 face detectors for the frontal-view face may be obtained by learning only a single face detector, according to an embodiment of the present invention.

Figure 11:
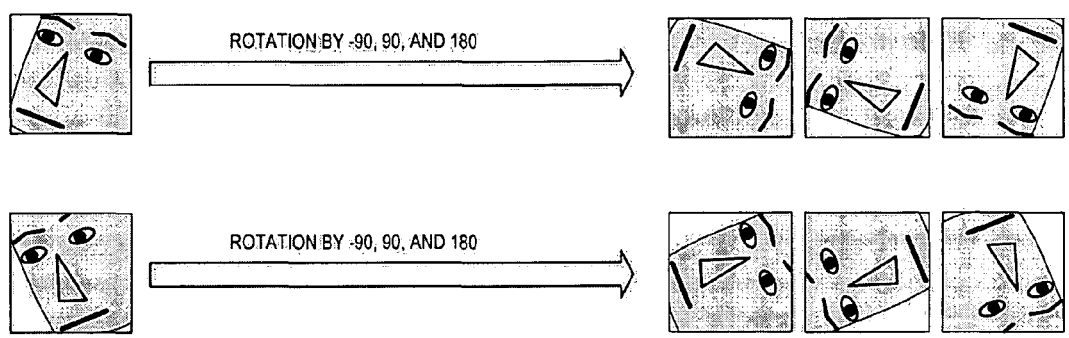
FIG. 11 illustrates a reducing of the number of face detectors desired for learning in the second Z-rotation mode for a left-view face, according to an embodiment of the present invention.

In a similar manner, referring to FIG. 11, 8 face detectors may be obtained using two face detectors with respect to a left-view face. In addition, a right-view face may be obtained by mirroring the left-view face.

Figure 12:
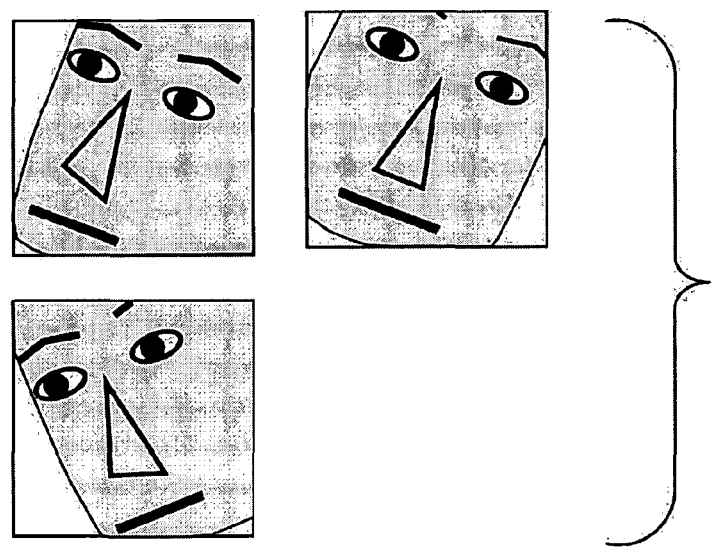
FIG. 12 illustrates faces to be learned, with respect to a frontal-view face, in the second Z-rotation mode, according to an embodiment of the present invention.

Consequently, when all of the X-, Y-, and Z-rotations are considered in the second Z-rotation mode, 2 (a frontal-view and a down-view)×3=6 face detectors may be needed to learn in the basic and extension modes. Here, faces to be learned, with respect to the frontal-view face, are shown in FIG. 12.

Accordingly, Table 2 below shows the number of face detectors needed, according to an embodiment of the present invention.

TABLE 2

| | | Number of necessary face detectors | Number of face detectors to learn |
|---|---|---|---|
| First Z mode | Basic mode | 18 | 10 |
| | Extension mode | 72 | 10 |
| Second Z mode | Basic mode | 12 | 6 |
| | Extension mode | 48 | 6 |

Figure 13:
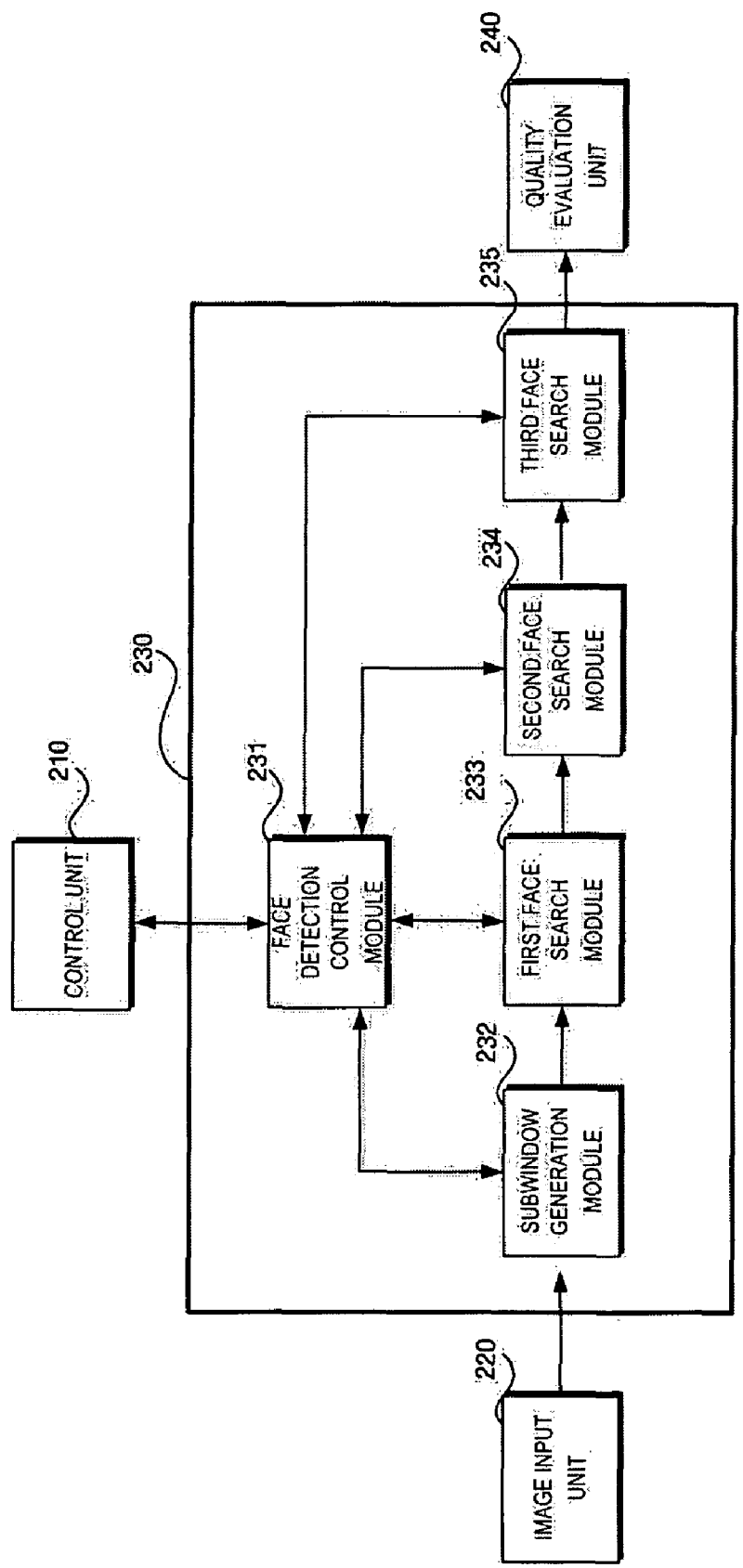
FIG. 13 illustrates a face detection unit, according to an embodiment of the present invention.

FIG. 13 illustrates a face detection unit 230, according to an embodiment of the present invention.

The face detection unit 230 may include a face detection control module 231, a subwindow generation module 232, a first face search module 233, a second face search module 234, and a third face search module 235. Here, the 'module' can be interpreted similarly to the above-described meaning of 'unit'.

The subwindow generation module 232 may generate a subwindow for an input image received from the image input unit 220. Here, the subwindow can be an image obtained by dividing the input image into a predetermined size. When the input image has a size of 320×240 (pixels), for example, the input image may be divided according to a 24×24 (pixels) size, so that the divided image becomes a subwindow of the input image. Here, the subwindow generation module 232 may define a minimum subwindow size, and sequentially supply the generated subwindow to the first face search module 233, while gradually increasing a transverse and/or longitudinal subwindow size starting from the minimum subwindow size, for example.

The first face search module 233, the second face search module 234, and the third face search module 235 may perform face detection for detecting a face from subwindows generated by the subwindow generation module 232.

The face detection control module 231 may control the operation of the subwindow generation module 232 associated with the operations of the first through third face search modules 233-235, for example.

When the first face search module 233 receives a subwindow from the subwindow generation module 232, the first search module 233 may detect a face from the subwindow using a predetermined algorithm. If a face is detected, the first face search module 233 may transfer the subwindow to the second face search module 234. If no face is detected, the user may manipulate the face detection control module 231 to control the subwindow generation module 232, for example, to generate a new subwindow to be transferred to the first face search module 233.

The second face search module 234 may detect a face from the transferred subwindow using a predetermined algorithm, for example. If a face is detected, the second face search module 234 may transfer the subwindow to the third face search module 235. If no face is detected, the user may manipulate the face detection control module 231 to control the subwindow generation module 232, for example, to generate a new subwindow to be transferred to the first face search module 233.

The third face search module 235 may detect a face from the transferred subwindow using a predetermined algorithm. Again, if a face is detected, the third face search module 235 transfers an image of the detected face to the quality evaluation unit 240. When a moving image is photographed, the detected face image may be stored directly in the storage unit 250 by way of the control unit 210 without being transferred to the quality evaluation unit 240.

If no face is detected by the third face search module 235, the user may manipulate the face detection control module 231 to control the subwindow generation module 232, for example, to generate a new subwindow to then be transferred to the first face search module 233.

Meanwhile, the respective face detection algorithms for the first through third search modules 233-235 will now be described in greater detail with reference to FIGS. 14A through 14C.

Figure 14A:
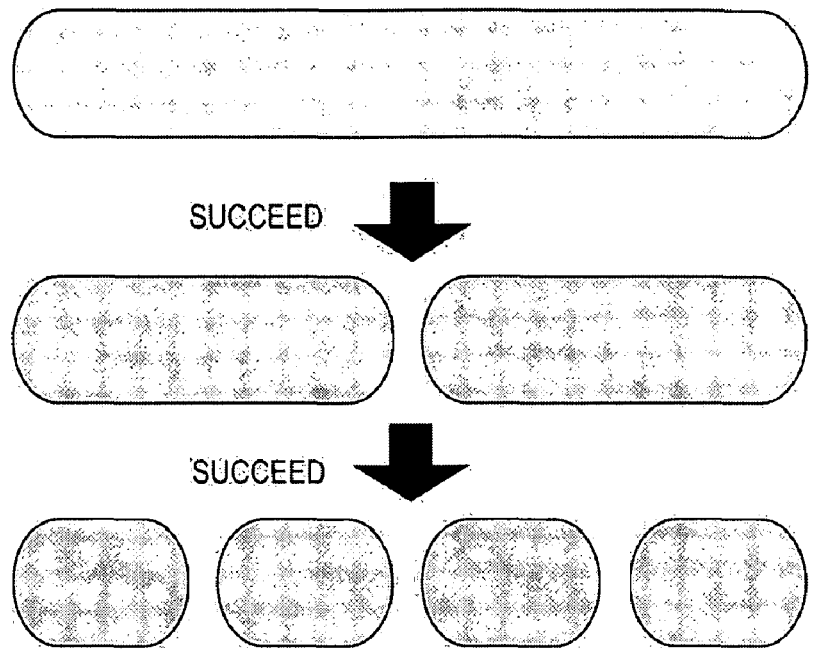
FIGS. 14A through 14C illustrate face search methods, according to embodiments of the present invention.
Figure 14B:
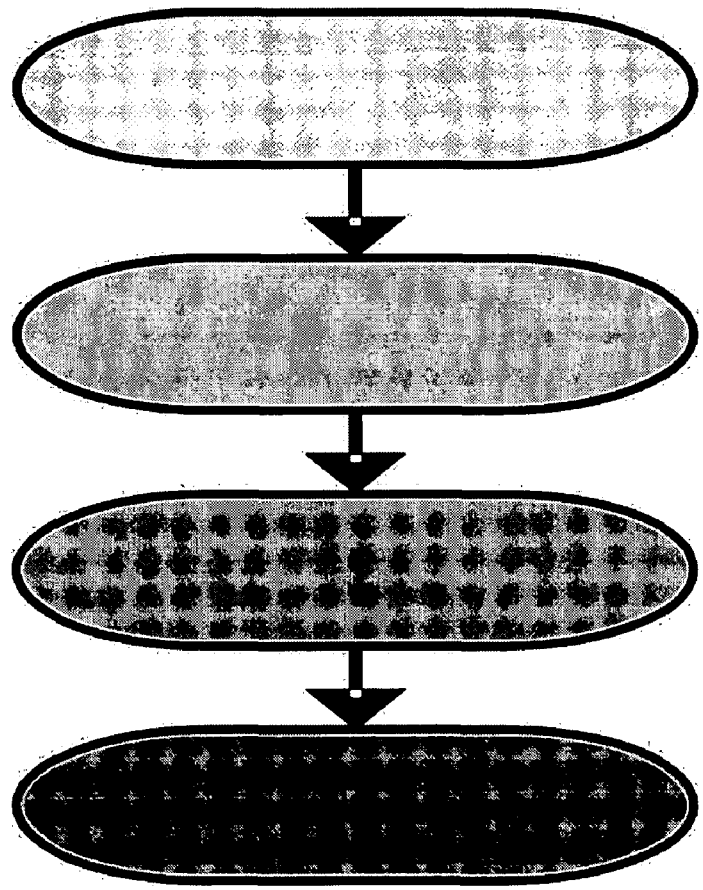
Figure 14C:
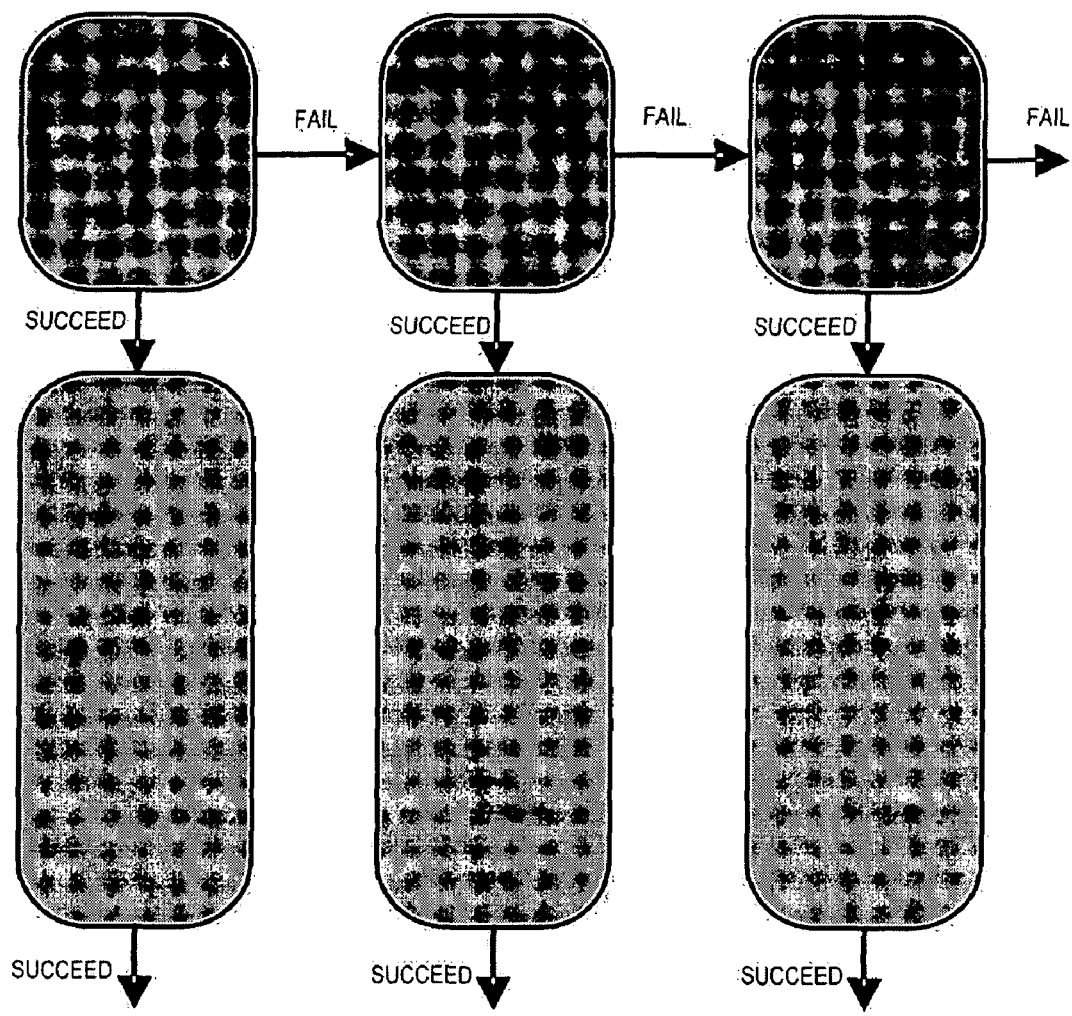

Accordingly, FIG. 14A illustrates a conventional coarse-to-fine search algorithm, FIG. 14B illustrates a conventional simple-to-complex search algorithm, and FIG. 14C illustrates a parallel-to-separated search algorithm, according to an embodiment of the present invention.

In the coarse-to-fine search algorithm, a whole-view classifier may be obtained at an initial stage of a cascaded classifier and then classifiers for gradually decreasing angles may be obtained. When the coarse-to-fine search algorithm is used, a non-face subwindow may be quickly removed in the early stages so that an entire detection time can be reduced. The whole-view classifier may only search for the shape of a face in a given subwindow using information that has been learned, regardless of the pose of the face.

In the simple-to-complex search algorithm, an easy and simple classifier may be disposed at an earlier stage and a difficult and complex classifier may be disposed at a latter stage to increase speed. Since most of non-faces subwindows can be removed in an initial stage, such a beneficial time savings effect can be achieved when the initial stage is made simple.

In the parallel-to-separated search algorithm, according to an embodiment of the present invention, face detectors for all directions may be arranged in parallel up to, for example, K-th stages, and face detectors for respective different directions may be independently and separately, for example, arranged starting from a (K+1)-th stage. In the parallel arrangement, when face detection succeeds in one direction, a subsequent stage in the same direction may be continued. However, when face detection fails in one direction, face detection may be performed in a different direction. In the separated arrangement, when face detection in one direction succeeds, a subsequent stage in the same direction may be continued. However, when face detection fails, a non-face determination may be immediately determined and the face detection terminated. When the parallel-to-separated search algorithm is used, the direction of a face in an input image may be determined during an initial stage, and thereafter, a face or a non-face determination, only with respect to the direction, may be made. Accordingly, according to embodiments of the present invention, face detectors having high accuracy and fast speed can be implemented.

Figure 15:
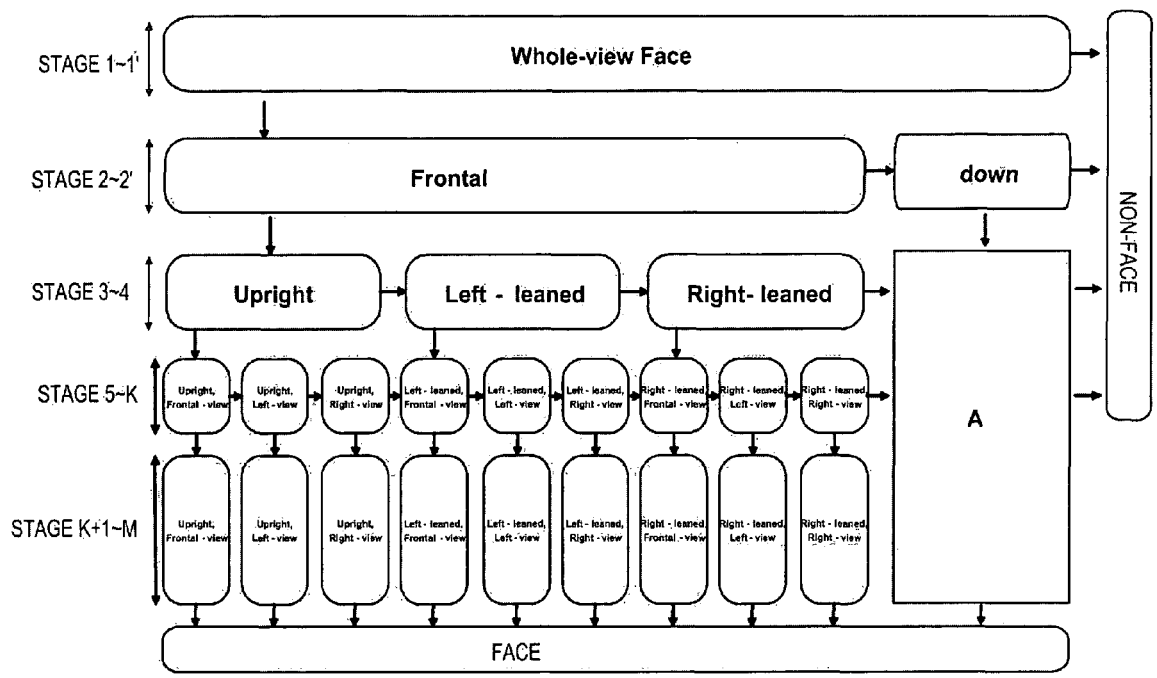
FIG. 15 illustrates the detecting of a face by combining three face search methods, according to an embodiment of the present invention.

When the algorithms illustrated in FIGS. 14A through 14C are combined, a multi-view face detector, illustrated in FIG. 15, can be obtained.

In FIG. 15, each illustrated block represents a face detector detecting a face in a direction written in the block. The area denoted by "A" operates in a similar manner as blocks to its left, and thus a description thereof is omitted. Downward arrows indicate the flow of an operation when a face detector succeeds in detecting a face, and rightward arrows indicate the flow of an operation when a face detector fails in detecting a face. These arrow designations are similar to designations presented in FIGS. 14A-14C.

As an example of such sequential operation, upon receiving a subwindow from the subwindow generation module 232, the first face search module 233 may discriminate whether the subwindow includes a face using a whole-view face detector based on already learned information in stage 1~1'.

When the presence of a face is determined in stage 1~1', the first face search module 233 transmits the subwindow to the second face search module 234. The second face search module 234 may then sequentially perform stages 2~2' and 3~4.

In stage 2~2', a frontal-view face and a down-view face may be defined with respect to the X-rotation and face detection may be performed based on the already learned information. In stage 3~4, an upright face, a left-leaning face, and a right-leaning face may be defined with respect to the Z-rotation and face detection may be performed based on the already learned information.

Here, stage 1~1', stage 2~2', and stage 3~4 may be performed using the coarse-to-fine search algorithm. Face detectors performing stage 1~1', stage 2~2', and stage 3~4 may internally use the simple-to-complex search algorithm.

Up to stage M, faces in all directions may be defined based on the already learned information. Here, up to stage K, when face detection succeeds, a subsequent downward stage may be performed, and when face detection fails, the operation may shift to a right face detector, for example. After stage K, when face detection succeeds, a subsequent downward stage may be performed, but when face detection fails, a non-face determination may be made and face detection on a current subwindow may be terminated. Accordingly, only with respect to a subwindow reaching stage M, can the presence of a face be determined.

Stage 5~K and stage K+1~M may be performed using the parallel-to-separated search algorithm. In addition, face detectors performing stage 5~K and stage K+1~M may internally use the simple-to-complex search algorithm.

Figure 16A:
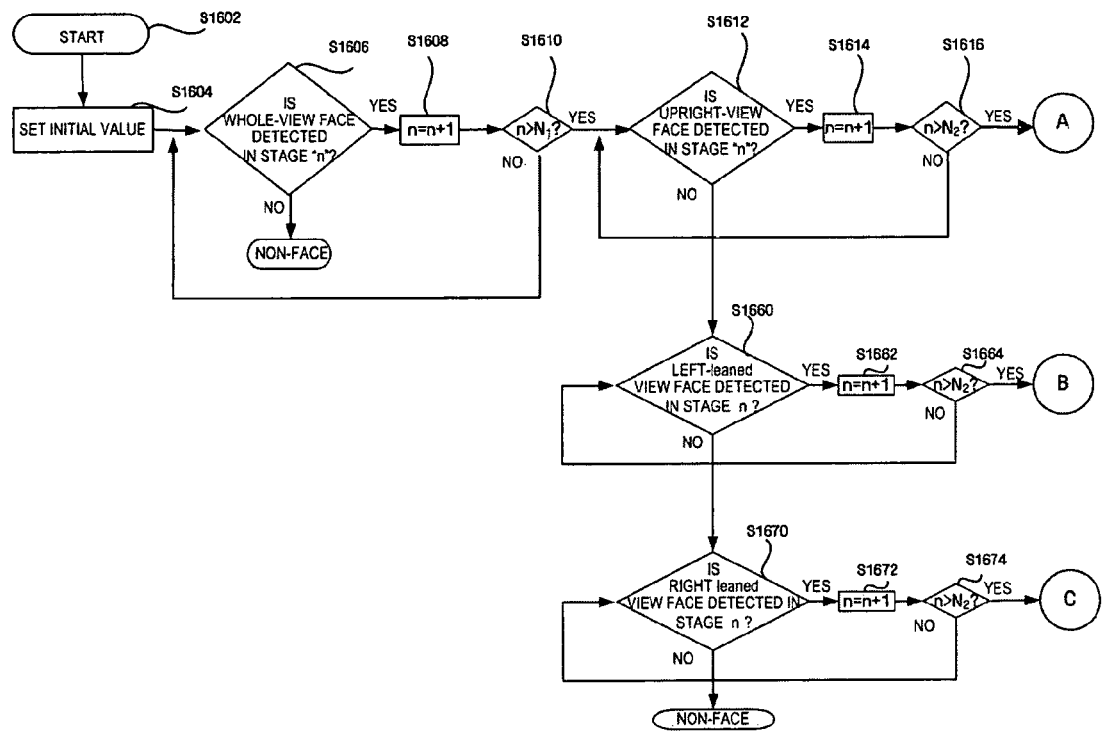
FIGS. 16A and 16B illustrate the detecting of a face, according to an embodiment of the present invention.
Figure 16B:
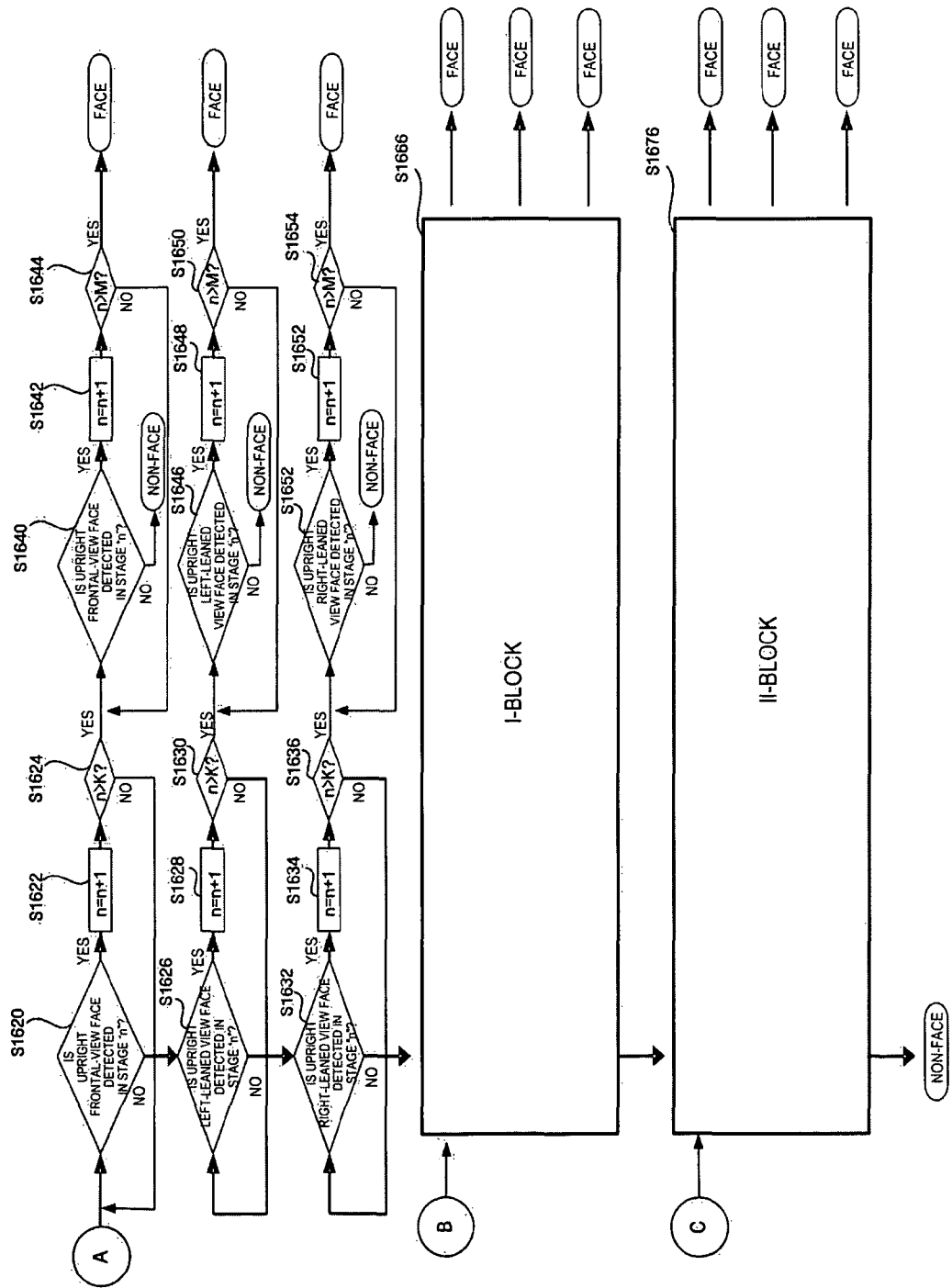
Figure 17:
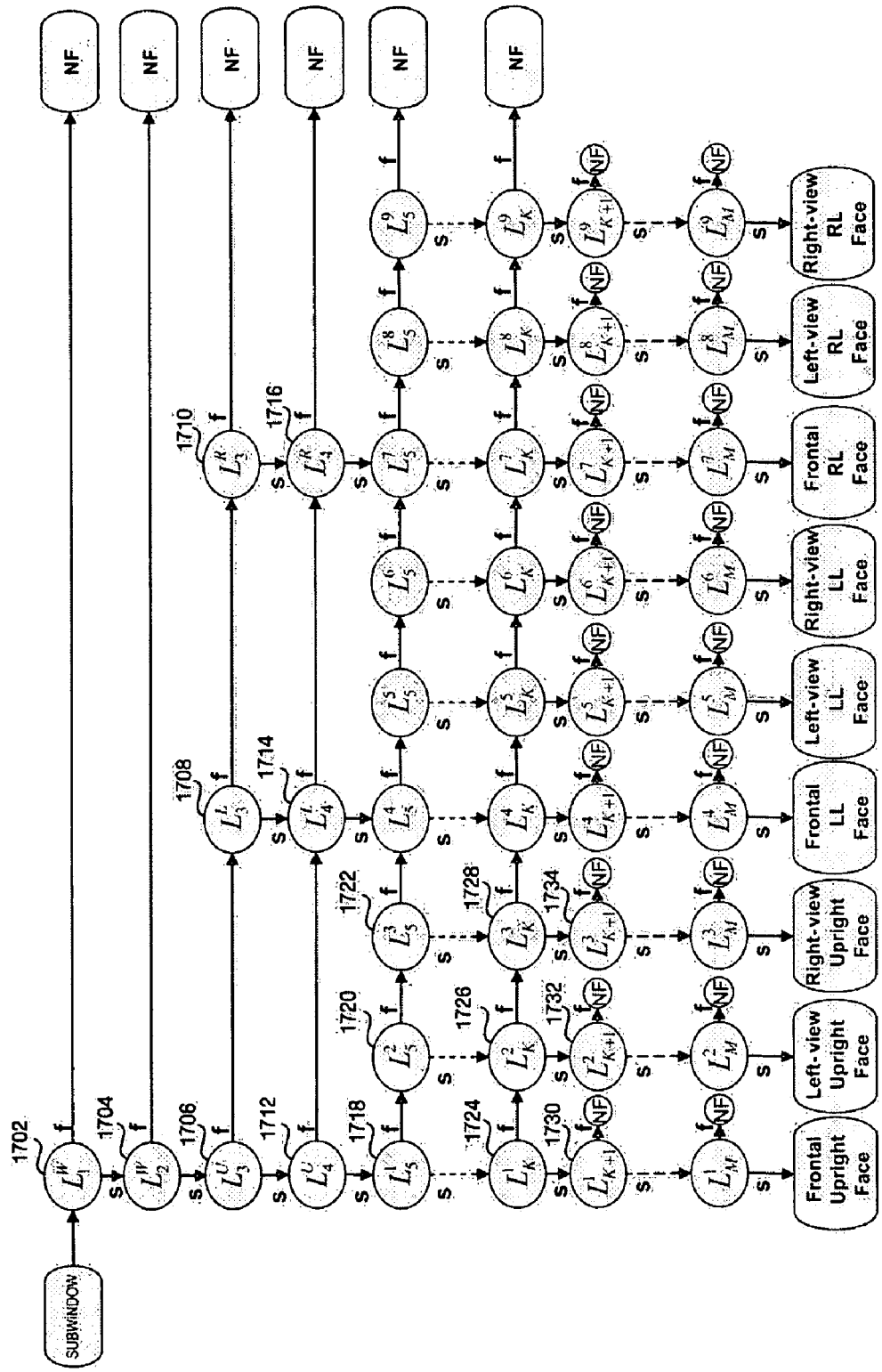
FIG. 17 illustrates another method, according to the embodiments of FIGS. 16A and 16B, according to an embodiment of the present invention.

FIGS. 16A and 16B illustrate a detecting of a face, according to an embodiment of the present invention. FIG. 17 illustrates another method, according to the embodiment illustrated in FIGS. 16A and 16B.

A corresponding method of detecting a face, according to an embodiment of the present invention, will now be described with more detail with reference to FIGS. 16A through 17. For sake of clarity and ease of explanation, it will be assumed herein that an image provided by the image input unit 220 is a frontal-view face defined with respect to the X-rotation. Accordingly, stage 2~2' shown in FIG. 15 may be omitted, and a stage for detecting a whole-view face will be referred to as stage 1~2.

In FIG. 17, the illustrated W represents "whole-view," U represents "upright", L represents "30° left-leaned", R represents "30° right-leaning", "f" represents "fail" indicating that face detection has failed, "s" represents "succeed" indicating that face detection has succeeded, and NF represents a "non-face" determination.

When the subwindow generation module 232 generates a subwindow, in operation S1602, an initial value for detecting a face in the subwindow is set, in operation S1604. The initial value includes parameters n, $N_1$, $N_2$, K, and M.

Here, the parameter "n" indicates a stage in the face detection, the parameter $N_1$ indicates a reference value for searching for a whole-view face, the parameter $N_2$ indicates a reference value for searching for an upright-view face, and a left-leaning view face and a right-leaning view face defined with respect to the Z-rotation. The parameter M indicates a reference value for searching for a frontal-view face, a left-view face, and a right-view face defined with respect to the Y-rotation, and the parameter K indicates a reference value for discriminating a stage for arranging face detectors separately from a stage for arranging face detectors in parallel, in the parallel-to-separated search algorithm, according to an embodiment of the present invention. Here, the initial value may be set such that n=1, $N_1$=2, $N_2$=4, K=10, and M=25, according to an embodiment of the present invention.

After the initial value is set, the first face search module 233 may detect a whole-view face in stage "n," in operation S1606, i.e., operation 1702. If a whole-view face is not detected, it may be determined that no face exists in the subwindow. If a whole-view face is detected, the parameter "n" is increased by 1, in operation S1608. Whether the value of "n" is greater than the value of $N_1$ is then determined, in operation S1610. If the value of "n" is not greater than the value of $N_1$, the method goes back to operation S1606. Since the parameter $N_1$ may be set to 2, in the embodiment of the present invention, the first face search module 233 may perform the simple-to-complex search algorithm on the whole-view face one time (1702→1704).

If the value of "n" is determined to be greater than the value of $N_1$, in operation S1610, the second face search module 234 performs a an upright-view face detection in stage "n", in operation S1612 (i.e., operation 1706). Here, the coarse-to-fine search algorithm may be used.

If the upright-view face is not detected in operation S1612 (i.e., operation 1706), a left-leaning viewface is detected in the same stage "n", in operation S1660 (i.e., operation 1708). If the left-leaning view face is not detected in operation S1660, a right-leaning view face may be detected in the same stage "n", in operation S1670 (i.e., operation 1710). If the right-leaning view face is not detected in operation S1670, it is determined that no face exists in the current subwindow. If a face is detected in operations S1612 (1706), S1660 (1708), or S1670 (1710), the value of "n" is increased by 1, in operations S1614, S1662, or S1672, respectively, and it is determined whether the increased value of "n" is greater than the value of $N_2$, in operations S1617, S1664, or S1674, respectively. If the value of "n" is not greater than the value of $N_2$, the method goes back to operation S1612, S1660, or S1670. Since the value of $N_2$ is set to 4, according to an embodiment of the present invention, the second face search module 234 performs the simple-to-complex search algorithm on the upright-view face, the left-leaning view face, or the right-leaning view face one time (operations 1706→1712, 1708→1714, or 1710→1716).

Hereinafter, solely for clarity of the description, it will be assumed that a face is detected in operation S1612 and the value of "n" is greater than the value of $N_2$ in operation S1616. Referring to FIG. 16B, the same operations as operations S1620 through S1654 may be performed in an I-block (S1666) and an II-block (S1676).

The third face search module 235 may detect an upright frontal-view face in stage "n", in operation S1620 (i.e., operation 1718). If the upright frontal-view face is not detected in operation S1620 (1718), an upright left-leaning view face may be detected in the same stage "n", in operation S1626 (i.e., operation 1720). If the upright left-leaning view face is not detected in operation S1626, an upright right-leaning view face may be detected in the same stage "n", in operation S1632 (i.e., operation 1722). If the upright right-leaning view face is not detected in operation S1632, face detection may be continued in the I-block (S1666) or the II-block (S1676).

If a face is detected in operations S1620(1718), S1626 (S1720), or S1632(1722), the value of "n" is increased by 1, in operations S1622, S1628, or S1634, respectively, and it is determined whether the increased value of "n" is greater than the value of K, in operations S1624, S1630, or S1635, respectively. If the value of "n" is not greater than the value of K, the method goes back to operations S1620, S1626, or S1632.

Since the value of K may be set to 10, in an embodiment of the present invention, the third face search module 235 performs the simple-to-complex search algorithm on the upright frontal-view face, the upright left-leaning view face, or the upright right-leaning view face, up to a maximum of 5 times (1718→1724, 1720→1726, or 1722→1728).

Hereinafter, for clarity of the description, it will be assumed that the upright frontal-view face is detected in operation S1620 and that the value of "n" is determined to be greater than the value of K.

The third face search module 235 may detects an upright frontal-view face in stage "n", in operation S1640 (S1730). If the upright frontal-view face is not detected in operation S1640 (S1730), it is determined that no face exists in the current subwindow. If the upright frontal-view face is detected in operation S1640, the value of "n" is increased by 1 in operation S1642 and whether the increased value of "n" is greater than the value of M may be determined, in operation S1644. If the increased value of "n" is not greater than the value of M, the method goes back to operation S1640. If the increased value of "n" is greater than the value of M, a face will be determined as existing in the current subwindow.

As described above, the third face search module 235 may operate using the parallel-to-separated search algorithm, according to an embodiment of the present invention, and the conventional simple-to-complex search algorithm. In other words, face detectors for all directions may be arranged in parallel up to stage K and may be arranged separately from each other from stage K+1 to stage M, and the simple-to-complex search algorithm may be used when a stage shifts.

Meanwhile, in an embodiment of the present invention, X-rotation faces may be detected first, Z-rotation faces may be detected next, and Y-rotation faces may be detected finally. However, such order is just an example, and it will be obvious to those skilled in the art that the order may be changed in face detection.

According to an embodiment of the present invention, in a case of photographing a still image, only a frontal-view face in a range of [−20°, 20°] may be detected with respect to the X-rotation, Y-rotation, and Z-rotation in the above-described face detection method. Thus, the control unit 210 may control the face detection control module 231 to operate only a face detector that detects faces in the range of [−20°, 20°].

Figure 18:
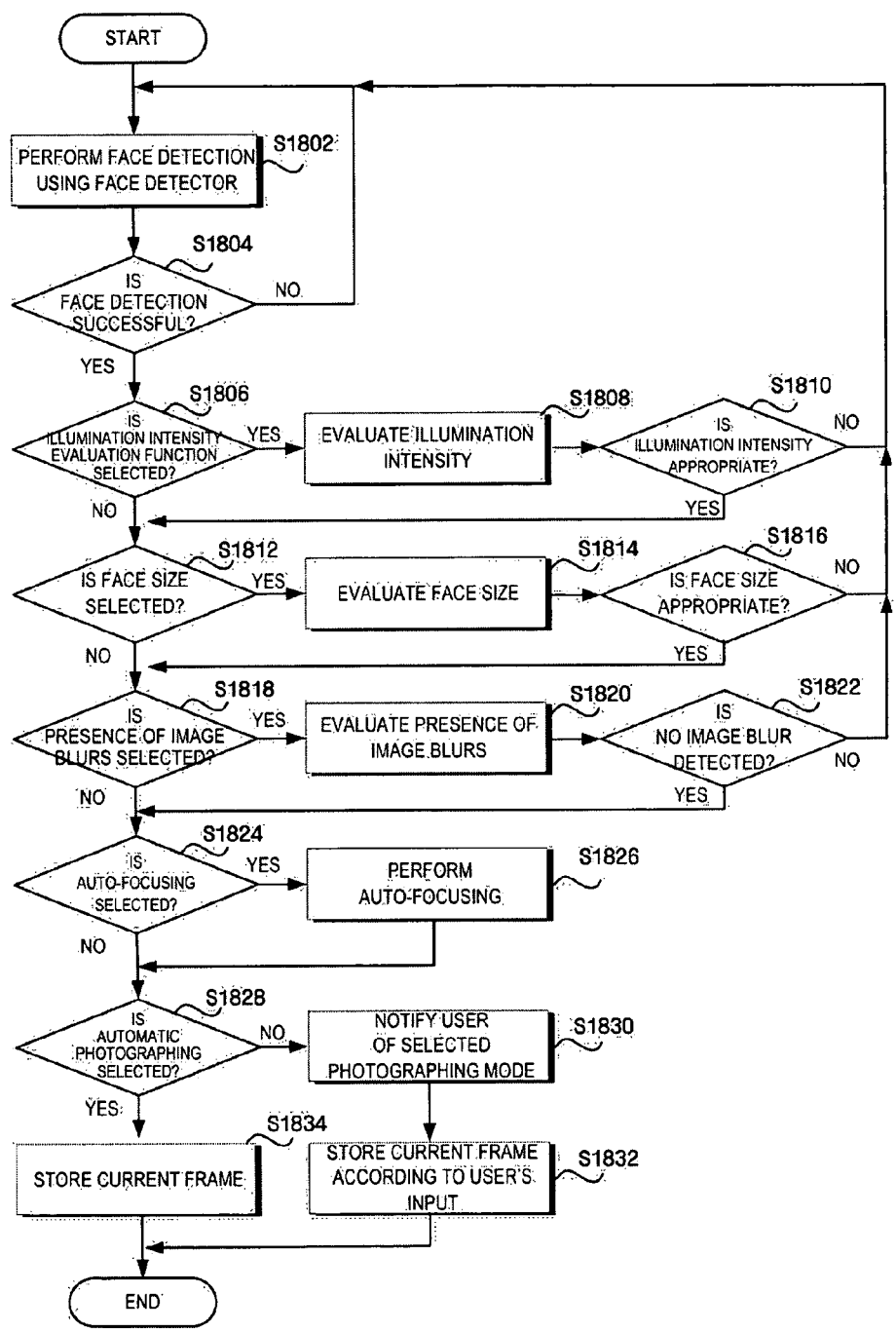
FIG. 18 illustrates a still face image photographing process, according to an embodiment of the present invention.

FIG. 18 illustrates a still face image photographing process, according to an embodiment of the present invention.

In order to photograph a still image, when a user selects a still image mode, e.g., through the user interface unit 260 shown in FIG. 2, the face detection unit 230 may detect a face from the input image received from the image input unit 220, in operation S1802. Here, face detection may be performed using a face detector that detects only a frontal-view face in a range of [−20°, 20°] with respect to the X-rotation, Y-rotation and Z-rotation.

If the face detection unit 230 succeeds in face detection, the procedure may proceed to an image quality evaluation operation (S1804-→S1806), and if not, a face may be detected from the next image (operations S1804-→S1802).

When the user selects illumination intensity as an evaluation item in the image quality selection mode, e.g., provided in the user interface unit 260, the illumination intensity may be evaluated (operations S1806-→S1808). If the evaluated illumination intensity is determined as being appropriate, the procedure proceeds to a subsequent operation (S1810-→S1812), and if not, a face may be detected from the next image (operations S1810-→S1802).

The illumination intensity may be evaluated in the following manner. When image illumination intensity v is greater than a predetermined critical image illumination intensity V*, the image may be stored.

In this case, the illumination intensity v may be defined as an overall average of an image I having a dimension of W*H and expressed by:

$$v(I) = \frac{\sum_{i=1}^{W} \sum_{j=1}^{H} I(i, j)}{W \times H} \quad (1)$$

Here, W represents a width of an image H represents a height of the image I, i and j represent indices of numbers of pixels for W and H, respectively, and I(i, j) represents illumination intensity at coordinates (i, j) of the image I.

When the user selects a face size as an evaluation item in the image quality selection mode, e.g., provided in the user interface unit 260, a face size may be evaluated (operations S1812->S1814). If the face size is determined as being appropriate, the procedure proceeds to a subsequent operation (S1816-→S1818), and if not, a face may be detected from the next image (operations S1816-→S1802). Methods of measuring the face size and determining whether the evaluated face size is appropriate or not, will be described in more detail below with reference to FIG. 20.

When the user selects a presence of image blurs as an evaluation item in the image quality selection mode, e.g., provided in the user interface unit 260, the presence of image blurs is evaluated (operations S1818-→S1820). If no image blur exists, the procedure proceeds to a subsequent operation (S1822-→S1824), and if not, a face may be detected from the next image (operations S1822-→S1802). A method of examining presence of blurs will be described in more detail below with reference to FIGS. 21 and 22.

When the user selects auto-focusing as an evaluation item in the image quality selection mode, e.g., provided in the user interface unit 260, auto-focusing, may be performed (operations S1824-→S1826). Here, a focus may be adjusted according to the center of the face, for example.

When the user selects automatic photographing as the photographing mode, e.g., provided in the user interface unit 260, the control unit 210 may store the current frame in the storage unit 250 (operations S1828-→S1834). On the other hand, when the user selects a manual photographing mode, the control unit 210 may notify the user of the selected mode, e.g., by a predetermined method, in operation S1830. When the user photographs the corresponding image manually, the control unit 210 may store the image in the storage unit 250, in operation S1832. In this case, the control unit 210 may control the corresponding image to be stored in the storage unit 250, for example. Here, the predetermined method may include a visual display mechanism, such as an LED, an alarm, and so on, for example.

Figure 19:
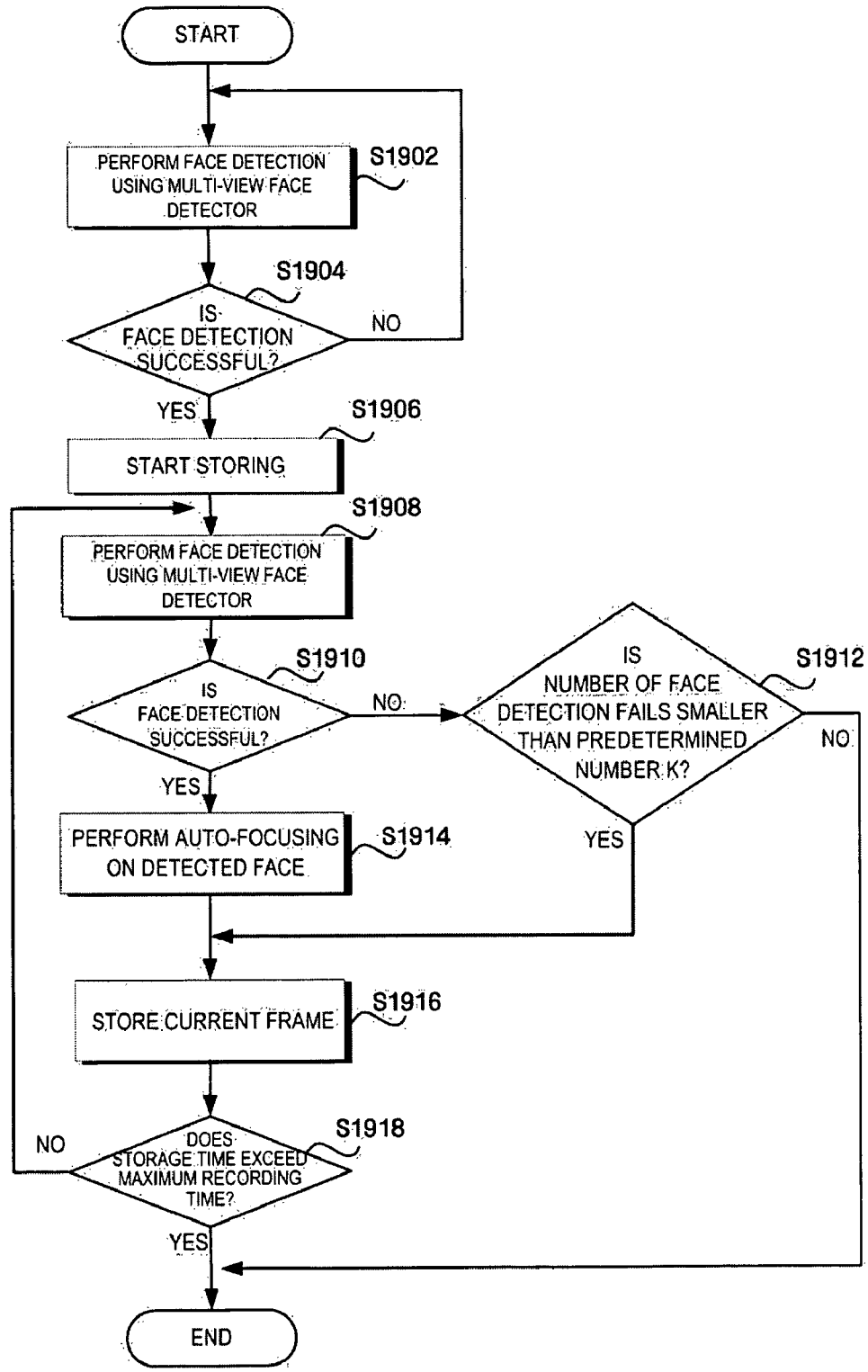
FIG. 19 illustrates a motion face image photographing process, according to an embodiment of the present invention.

FIG. 19 illustrates a motion face image photographing process, according to an embodiment of the present invention.

In order for a user to photograph a moving image, when the user selects a moving image mode, e.g., through the user interface unit 260 shown in FIG. 2, the face detection unit 230 may detect for a face from the image received from the image input unit 220, in operation S1902. Here, the face detection unit 230 may employ a multi-view face detector. If the face detection unit 230 succeeds in face detection, a frame of the detected image may be stored (operations S1904-→S1906), and if not, a face may be detected from the next image (operations S1904-→S1902). The frame stored in operation S1906 may be the first frame of a to-be-stored moving image, for example.

In order to obtain a second frame of the picture frame and frames following the second frame, a face may be detected from the image received by the image input unit 220 using the multi-view face detector, in operation S1908. If the face detection is successful, an auto-focusing function may be performed (operations S1910-→S1914), the currently detected image frame may be stored, in operation S1916. The performing of the auto-focusing function may prevent an abrupt change in the focus due to other objects or matter appearing on the picture image. If it is determined, in operation S1910, that the face detection is not successful, it is determined whether a number of face detection fails is smaller than a predetermined number K, in operation S1912. If the number of face detection fails is smaller than the predetermined number K, the current frame may be stored, in operation S1916. In other words, even if no face is detected from the frame, the first frame may have already been stored, in operation S1906, which means that storing of the moving image has already started. Thus, in order to prevent the stored moving image from being disconnected, the corresponding frame may be stored even if the face detection fails a predetermined number of times. Here, the value of K may preferably be in a range of 10-15, and a time corresponding thereto may preferably range from about 0.5 to about 1 second. If it is determined in operation S1912 that the number of face detection fails is not smaller than the predetermined number K, storing of the moving image may be terminated.

If the user forcibly presses a button to terminate photographing, in the middle of photographing the moving image or where a photographing time exceeds a preset recording time of the moving image, storing of the moving image may be terminated. Otherwise, face detection may be performed on the next image frame using the multi-view face detector, in operation S1918. For example, assuming that the user sets a maximum recording time T to 5 minutes, if the storage time exceeds 5 minutes, the photographing is automatically terminated.

Figure 20:
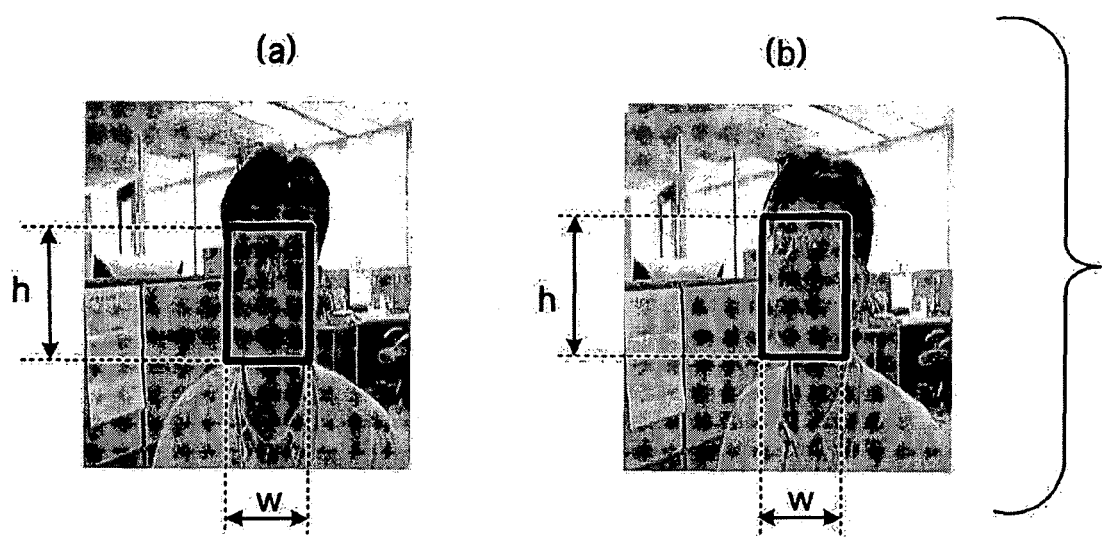
FIG. 20 illustrates a picture image view showing examples of the detecting of face sizes, according to an embodiment of the present invention.

FIG. 20 illustrates in portions (a) and (b) a picture image view showing examples of detecting face sizes, according to an embodiment of the present invention.

To evaluate a face size, it will be assumed herein that if a face size (w, h) in the detected image is greater than a preset critical size (W*, H*), the face size (w, h) may be determined to be an appropriate size. In this case, face size (w, h), in which w denotes a width and h denotes a height, represents a size of a region indicating a face in the detected image.

Figure 21:
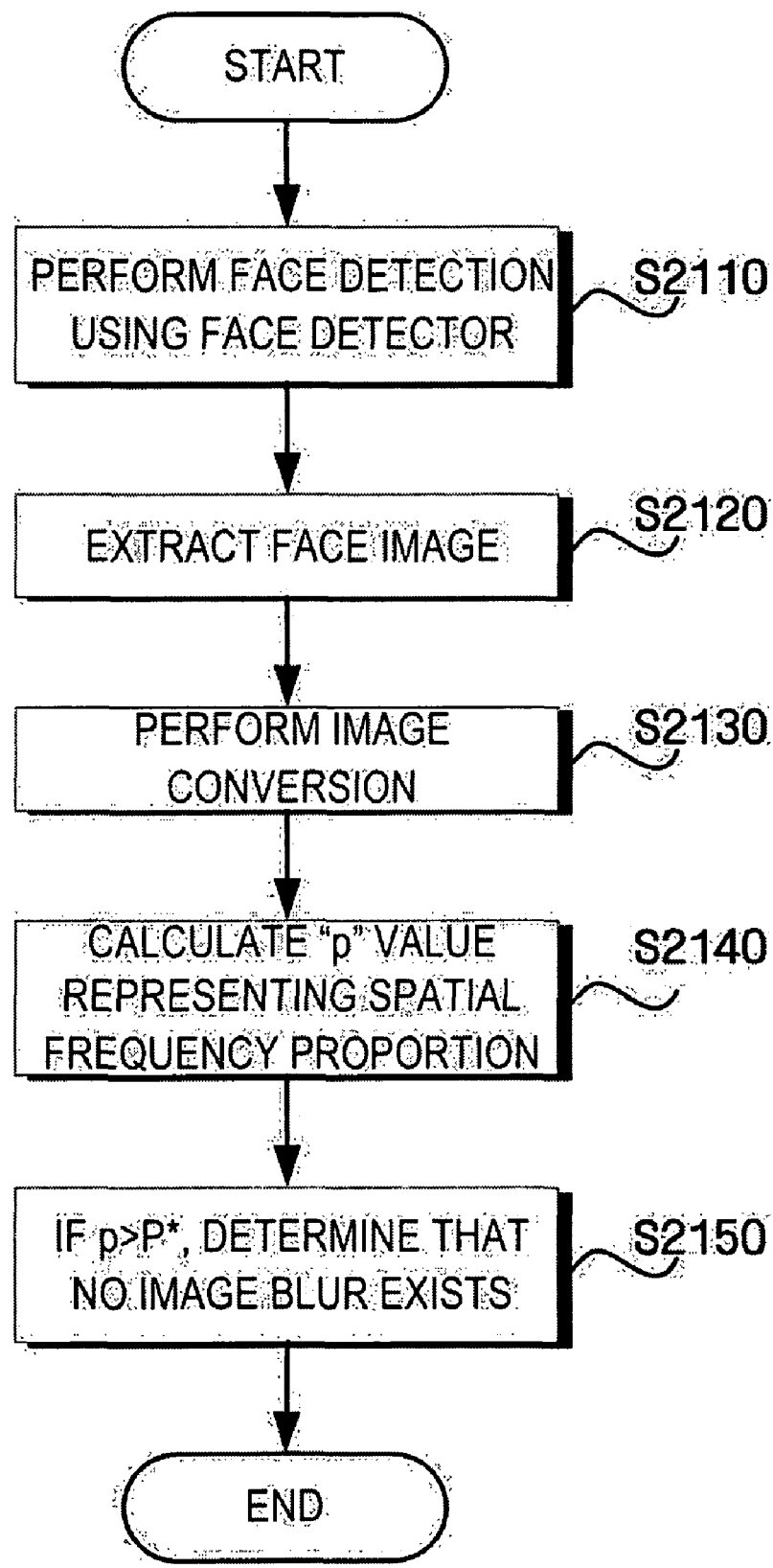
FIG. 21 illustrates a detecting for blurs, according to an embodiment of the present invention.

FIG. 21 illustrates a detecting of blurs, according to an embodiment of the present invention.

A portable photographing apparatus may perform face detection using a face detector, in operation S2110, and then extract an image of the detected face image, in operation S2120. Here, image conversion may be performed using a 2-D DCT (two-dimensional Discrete Cosine Transform) algorithm, in operation S2130, and a value "p" representing a spatial frequency proportion may be obtained based on information about the converted image, in operation S2140. If the value "p" is greater than a preset spatial frequency critical proportion P then existence of blurs may determined, in operation S2150.

Figure 22:
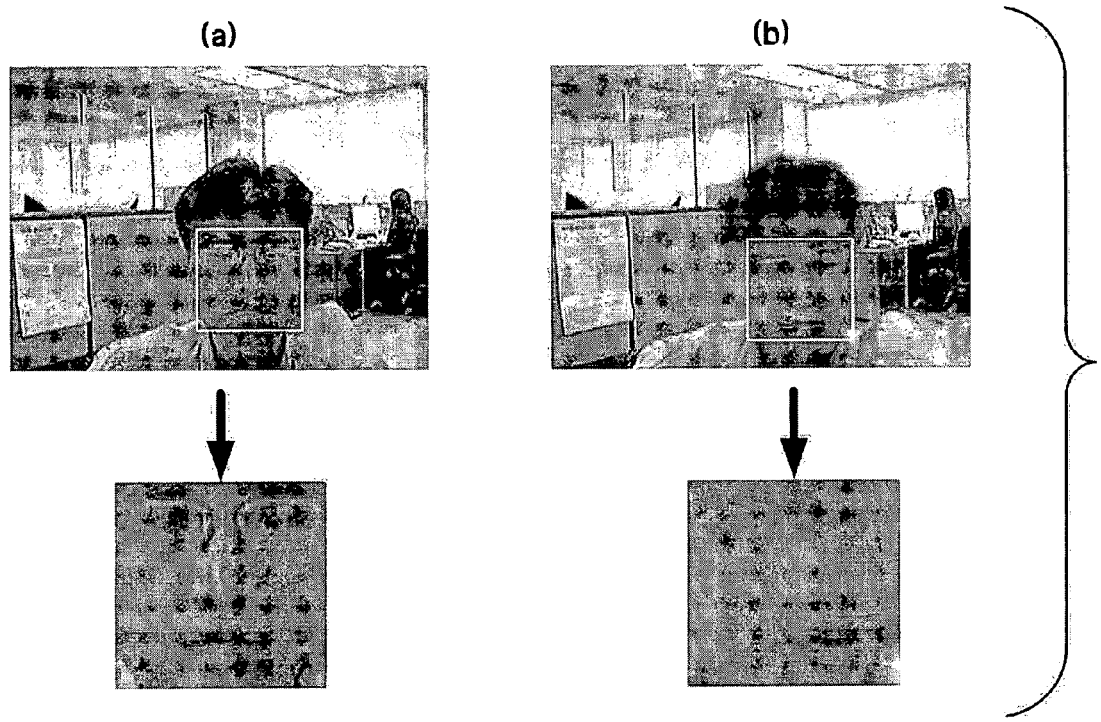
FIG. 22 illustrates a picture image view showing an example a detecting of blurs, according to an embodiment of the present invention.

FIG. 22 illustrates a picture image view showing an example of detecting of blurs, according to an embodiment of the present invention.

In FIG. 22, portion (a) shows a case where the value "p" is greater than P indicating that no blur exists in the picture image, and portion (b) shows a case where the value "p" is smaller than P indicating that blurs exist in the picture image.

According to embodiments of the present invention, when a user photographs a still image, the portable photographing apparatus may automatically detect a location of a face to notify the user of an appropriate photographing state, thereby enabling the user to obtain an improved quality still image.

In addition, when the user photographs a moving image, the moving image may be stored only when a face is detected, thereby extending the time during which all moving images may be stored.

Embodiments of the present invention have been described with at least reference to flowchart illustrations of methods. It will be further understood that each block of the flowchart illustrations, and combinations of blocks in the flowchart illustrations, can be implemented by computer readable code. The computer readable code can be provided to a processor of a general purpose computer, special purpose computer, or other programmable data processing apparatus to produce a machine, such that the code, which execute via the processor of the computer or other programmable data processing apparatus, are for implementing the operations specified in the flowchart block or blocks, for example. The computer readable code may also be stored in a medium, e.g., a computer usable or computer-readable memory, that can include directions for a computer or other programmable data processing apparatus to function in a particular manner, such that the code stored in the medium produces an article of manufacture to implement the operations specified in the flowchart block or blocks. The computer readable code may also be loaded onto a computer or other programmable data processing apparatus, for example, to cause a series of operations to be performed on the computer or other programmable apparatus, for example, to produce a computer implemented process such that the instructions that execute on the computer or other programmable apparatus include elements to implement the operations specified in the flowchart block or blocks.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A portable photographing apparatus, comprising:
   a face detection unit to search for a face in a received image and identify a corresponding detected face in the received image;
   a storage unit to store the received image, upon the face detection unit identifying the detected face in the received image, as a moving image in a first mode; and
   a quality evaluation unit to evaluate a quality of the received image and to store the received image as a still image in a second mode upon the face detection unit identifying the detected face in the received image and a satisfaction of a selective predetermined condition evaluated based on a quality evaluation of the received image.

2. The portable photographing apparatus of claim 1, further comprising an image input unit to receive the image as the received still image.

3. The portable photographing apparatus of claim 1, wherein the quality evaluation unit evaluates an illumination condition of the received image.

4. The portable photographing apparatus of claim 1, wherein the quality evaluation unit evaluates a face size of the received image.

5. The portable photographing apparatus of claim 1, wherein the quality evaluation unit evaluates an image blur state of the received image.

6. The portable photographing apparatus of claim 1, wherein the quality evaluation unit causes a focusing to be adjusted on the face in the received image as detected by the face detection unit.

7. The portable photographing apparatus of claim 1, further comprising a user interface unit to provide for a user interface to allow a user to select a moving image mode or a still image mode.

8. The portable photographing apparatus of claim 1, further comprising a user interface unit to provide for a user interface to allow a user to select an automatic photographing mode or a manual photographing mode for when the face is detected.

9. The portable photographing apparatus of claim 1, further comprising a user interface unit to provide for a user interface to allow a user to select an image quality characteristic to be implemented for the quality evaluation.

10. A portable photographing apparatus, comprising:
a face detection unit to detect a face from a received image;
a storage unit to store the received image upon detection of the face as a moving image in a first mode;
a quality evaluation unit to evaluate a quality of the received image and to store the received image as a still image in a second mode upon a satisfaction of a selective predetermined condition evaluated based on a quality evaluation of the received image; and
an image input unit to receive the image as the received still image, wherein the face detection unit comprises:
a subwindow generation module to receive an image from the image input unit and generate a subwindow corresponding to the received image;
a first face search module to receive the subwindow from the subwindow generation module and to detect a face from the subwindow to determine whether a frontal-view face exists;
a second face search module to, if the frontal-view face is detected by the first face search module, sequentially detect two mode faces among a first mode face generated by up and down facial rotation, a second mode face made by a leaning of a head to either side of left and right sides, and a third mode face made by left and right facial rotation; and
a third face search module to detect a remaining mode face not detected by the second face search module.

11. The portable photographing apparatus of claim 10, wherein the face detection unit further comprises:
a face detection control module to generate a new subwindow to be supplied to the first face search module if no face is detected by any of the first face search module, the second face search module, or the third face search module.

12. The portable photographing apparatus of claim 10, wherein the third face search module sequentially performs an operation of arranging face detectors for all directions in parallel, and when succeeding in face detection in one direction performing face detection in a same direction using a more complex face detector, and when failing in face detection in one direction performing face detection in a different direction, and an operation of independently and separately arranging the face detectors for all directions, such that when succeeding in face detection in one direction performing face detection in a same direction using a more complex face detector, and when failing in face detection determining that a face is not detected from the input image.

13. The portable photographing apparatus of claim 10, wherein the second face search module performs sequential detection of the two mode faces using a coarse-to-fine search algorithm.

14. The portable photographing apparatus of claim 10, wherein the second face search module attempts detection of one of the two mode faces using a simple-to-complex search algorithm.

15. A method of photographing a picture in a portable photographing apparatus based on face detection, the method comprising:
receiving an image;
performing a detection for a face in the received image and identifying a corresponding detected face in the received image; and
storing the received image having the detected face, based upon the performing of the detection for the face in the received image, as a moving image in a first mode, and evaluating the quality of the received image having the detected face and storing the received image having the detected face as a still image in a second mode upon satisfaction of a selective predetermined condition evaluated based on a quality evaluation of the received image.

16. The method of claim 15, wherein the selective predetermined condition is an illumination condition of the received image.

17. The method of claim 15, wherein the selective predetermined condition is a face size of the received image.

18. The method of claim 15, wherein the selective predetermined condition is an image blur state of the received image.

19. The method of claim 15, wherein the selective predetermined condition is focusing adjustment performed on the face in the received image.

20. The method of claim 15, further comprising providing a user interface to allow a user to select a moving image mode or a still image mode.

21. The method of claim 15, further comprising providing a user interface to allow a user to select an automatic photographing mode or a manual photographing mode for the face detection.

22. The method of claim 15, further comprising providing a user interface to allow a user to select an image quality condition for the predetermined condition.

23. At least one non-transitory medium comprising computer readable code to implement the method of claim 15.

24. A method of photographing a picture in a portable photographing apparatus based on face detection, the method comprising:
receiving an image;
detecting a face from the received image; and
storing the received image detected by the face detection unit as a moving image in a first mode, and evaluating the quality of the received image detected by the face detection unit and storing the received image as a still image in a second mode upon satisfaction of a selective predetermined condition evaluated based on a quality evaluation of the received image,
wherein the detecting of the face comprises:
sequentially selectively detecting two mode faces among a first mode face generated by up and down facial rotation, a second mode face generated by a leaning of a head to either side of left and right sides, and a third mode face made by left and right facial rotation;

detecting a remaining mode face that is not detected in the sequentially detecting of the two faces; and if the remaining mode face is detected in the detecting of the remaining mode face, determining that the face is detected in the image, wherein the detecting of the remaining mode face comprises arranging face detectors for all directions in parallel to perform face detection, and independently and separately arranging the face detectors for all directions to perform face detection.

25. The method of claim 24, wherein in the parallel arranging of the face detectors, when succeeding in face detection in one direction face detection is performed in a same direction using a more complex face detector, and when failing in face detection in one direction face detection is performed in a different direction.

26. The method of claim 24, wherein in the independently and separately arranging of the face detectors, when succeeding in face detection in one direction face detection is performed in a same direction using a more complex face detector, and when failing in face detection non-detection of a face is determined for the received image.

27. The method of claim 24, wherein the sequentially detecting of the two mode faces comprises sequentially detecting the two mode faces using a coarse-to-fine search algorithm.

28. The method of claim 24, wherein the sequentially detecting of the two mode faces comprises sequentially detecting one of the two mode faces using a simple-to-complex search algorithm.

29. An imaging apparatus, comprising:
a face detection unit to detect a face from a received image through a multilayer face detection scheme, with the different layers of face detection separately detecting for a particular potential orientation of a face in the received image and with the different layers of face detection being implemented with a number of face orientation detectors for a successful face detection less than all available face detectors respectively for a number of particular potential face orientations in the received image; and
a storage unit to selectively store the received image based upon a detection of the face by the different layers of face detection.

30. The apparatus of claim 29, wherein plural of the different layers of face detection are sequenced such that a subsequent layer of face detection is implemented after a current layer of face detection is successful, and upon the current layer of face detection being unsuccessful a different layer of face detection from the subsequent layer of face detection and the current layer of face detection is implemented.

31. A portable photographing apparatus, comprising:
a face detection unit to detect a face from a received image after a determination that the face exists in the received image;
a storage unit to selectively store the received image based upon detection of the face as a face detection moving image or a face detection still image, wherein the selective storing of the received image as the face detection still image is based upon a quality evaluation of the received image; and
a quality evaluation unit to perform the quality evaluation based on a certain aspect of the detection of the face, after the detection of the face, of the received image and to store the received image in the selective storing by the storage unit as the face detection still image upon a satisfaction of a selective predetermined condition evaluated based on the quality evaluation of the received image.

32. The portable photographing apparatus of claim 31, further comprising:
a notification unit to notify a user of the quality evaluation of the received image.

33. The portable photographing apparatus of claim 32, wherein the notification unit notifies by visual display mechanism.

34. The portable photographing apparatus of claim 32, wherein the notification unit notifies by alarm.

35. The portable photographing apparatus of claim 31, wherein the quality evaluation unit causes a focusing to be adjusted on the face in the received image as detected by the face detection unit.

36. The portable photographing apparatus of claim 31, wherein the aspect of the detection of the face is an illumination condition of the received image.

37. The portable photographing apparatus of claim 31, wherein the aspect of the detection of the face is a face size of the received image.

38. The portable photographing apparatus of claim 31, wherein the aspect of the detection of the face is an image blur state of the received image.

39. The portable photographing apparatus of claim 31, further comprising a user interface unit to provide a user interface to allow a user to select an automatic photographing mode or a manual photographing mode when the face is detected.

40. A method of photographing a picture in a portable photographing apparatus based on face detection, the method comprising:
receiving an image;
detecting a face from the received image;
selectively evaluating a quality of the received image based on a certain aspect of the detection of the face, with the quality evaluation being selective based upon a determination of whether the face is detected in the received image; and
notifying a user of a result of the quality evaluation of the received image based upon the determination of whether the face is detected in the received image.

41. The method of claim 40, wherein, in the evaluating of the quality of the received image, a focus is adjusted on the face in the received image.

42. The method of claim 40, wherein the aspect of the detection of the face is an illumination condition of the received image.

43. The method of claim 40, wherein the aspect of the detection of the face is a face size of the received image.

44. The method of claim 42, wherein the aspect of the detection of the face is an image blur state of the received image.

45. The method of claim 40, wherein the notifying is by a visual display mechanism.

46. The method of claim 40, wherein the notifying is by alarm.

47. The method of claim 40, further comprising:
providing a user interface to allow a user to select an automatic photographing mode or a manual photographing mode when the face is detected.

48. The method of claim 40, wherein, in the selective quality evaluation, the selective quality evaluation of the received image includes performing the evaluation of the quality of the received image when the determination indicates that the face is detected from the received image and not performing the evaluation of the quality of the received image when the determination indicates that the face is not detected from the received image.

49. The method of claim 48, wherein, in the selective quality evaluation, when the determination indicates that the face is not detected from the received image, the received image is not stored and the detecting is performed for a face from another received image, subsequent to the received image, and the selective quality evaluation is performed for the other received image, such that the other received image is stored based upon the quality evaluation of the detected face in the other received image.

50. A method of photographing a picture in a portable photographing apparatus based on face detection, the method comprising:

receiving an image;

detecting a face from the received image;

evaluating a quality of the received image based on a certain aspect of the detection of the face; and notifying a user of the evaluation condition, wherein evaluating of the quality of the received image is based at least on a determined face size of the received image.

51. A method of photographing a picture in a portable photographing apparatus based on face detection, the method comprising:

receiving an image;

detecting a face from the received image after a determination that the face exists in the received image;

selectively storing the received image based upon detection of the face as a face detection moving image or a face detection still image, wherein the selective storing of the received image as the face detection still image is based upon an evaluation of a quality of the received image; and evaluating the quality of the received image, after the detection of the face, based on a certain aspect of the detection of the face.

52. The method of claim 51, further comprising notifying a user of the evaluation of the quality of the received image.

* * * * *

UNITED STATES PATENT AND TRADEMARK OFFICE
CERTIFICATE OF CORRECTION

PATENT NO. : 7,885,531 B2
APPLICATION NO. : 11/317026
DATED : February 8, 2011
INVENTOR(S) : Jung-bae Kim et al.

It is certified that error appears in the above-identified patent and that said Letters Patent is hereby corrected as shown below:

Column 22, Line 52, In Claim 44, delete "claim 42," and insert --claim 40,-- therefor.

Signed and Sealed this
Nineteenth Day of April, 2011

David J. Kappos
*Director of the United States Patent and Trademark Office*